United States Patent
Miklos et al.

(10) Patent No.: US 10,567,315 B2
(45) Date of Patent: *Feb. 18, 2020

(54) METHODS AND APPARATUS FOR DETERMINING, BASED ON FEATURES OF AN ELECTRONIC COMMUNICATION AND SCHEDULE DATA OF A USER, REPLY CONTENT FOR INCLUSION IN A REPLY BY THE USER TO THE ELECTRONIC COMMUNICATION

(71) Applicant: Google LLC, Mountain View, CA (US)

(72) Inventors: Balint Miklos, Zurich (CH); Ijeoma Emeagwali, San Francisco, CA (US); Stella Schieffer, Zurich (CH); Katie Hart, Zurich (CH); Jonathan Aroner, Zurich (CH); Phillip Sharp, Sunnyvale, CA (US); Jung-won Shin, Mountain View, CA (US); Marina Ganea, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,384

(22) Filed: Feb. 15, 2019

(65) Prior Publication Data

US 2019/0182185 A1    Jun. 13, 2019

Related U.S. Application Data

(63) Continuation of application No. 14/994,113, filed on Jan. 12, 2016, now Pat. No. 10,243,890.

(51) Int. Cl.
*H04L 12/58* (2006.01)
*G06Q 10/00* (2012.01)
*G06Q 10/10* (2012.01)

(52) U.S. Cl.
CPC .............. *H04L 51/02* (2013.01); *G06Q 10/00* (2013.01); *G06Q 10/10* (2013.01); *G06Q 10/109* (2013.01); *G06Q 10/1093* (2013.01)

(58) Field of Classification Search
CPC ............... G06Q 10/10; G06Q 10/1095; G06Q 10/1093; G06Q 10/107; G06F 17/18;
(Continued)

(56) References Cited

U.S. PATENT DOCUMENTS

| 5,774,867 A | 6/1998 | Fitzpatrick et al. |
| 6,640,230 B1 | 10/2003 | Alexander et al. |

(Continued)

FOREIGN PATENT DOCUMENTS

EP    1737202    12/2001

OTHER PUBLICATIONS

International Search Report and Written Opinion of PCT Ser. No. PCT/US16/68647 dated Mar. 23, 2017.

*Primary Examiner* — Aftab N. Khan
(74) *Attorney, Agent, or Firm* — Middleton Reutlinger

(57) ABSTRACT

Methods and apparatus related to determining reply content for a reply to an electronic communication and providing the reply content for inclusion in the reply. Some of those implementations are directed to determining, based on an electronic communication that includes an event and is sent to a user, reply content that is tailored to the electronic communication and tailored to schedule data of the user that is temporally related to the event, and providing the reply content for inclusion in a reply by the user to the electronic communication. For example, the reply content may be automatically included in the reply and/or suggested for inclusion in the reply.

16 Claims, 11 Drawing Sheets

(58) Field of Classification Search
CPC ........ G06F 15/16; A63F 13/12; A63F 13/497; A63F 13/87; A63F 13/795; A63F 2300/406; A63F 2300/5566; A63F 2300/572; H04L 67/12; H04W 4/021; H04W 4/206; H04W 8/18; H04W 76/02
See application file for complete search history.

(56) References Cited

U.S. PATENT DOCUMENTS

| | | | |
|---|---|---|---|
| 7,584,253 | B2 | 9/2009 | Curbow et al. |
| 9,092,742 | B1 | 7/2015 | Zeng et al. |
| 2003/0004773 | A1 | 1/2003 | Clark et al. |
| 2005/0021636 | A1 | 1/2005 | Kumar |
| 2005/0276397 | A1* | 12/2005 | Hiatt ................ H04M 3/42161 379/90.01 |
| 2007/0011367 | A1* | 1/2007 | Scott ..................... G06Q 10/10 710/48 |
| 2008/0086431 | A1* | 4/2008 | Robinson ............... A63F 13/12 706/11 |
| 2009/0292690 | A1 | 11/2009 | Culbert |
| 2014/0288990 | A1* | 9/2014 | Moore ............... G06Q 10/1095 705/7.19 |
| 2016/0212087 | A1* | 7/2016 | Nelson ................ H04L 51/066 |
| 2017/0180276 | A1* | 6/2017 | Gershony ............... H04L 51/02 |
| 2017/0262943 | A1* | 9/2017 | Akutagawa ....... G06F 16/90324 |

\* cited by examiner

METHODS AND APPARATUS FOR DETERMINING, BASED ON FEATURES OF AN ELECTRONIC COMMUNICATION AND SCHEDULE DATA OF A USER, REPLY CONTENT FOR INCLUSION IN A REPLY BY THE USER TO THE ELECTRONIC COMMUNICATION

BACKGROUND

Users are often inundated with electronic communications such as emails, SMS communications, and social networking communications. Many electronic communications that are sent to a user relate to an event such as a business meeting, a party, dinner at a restaurant, a get together with friends, etc. Some electronic communications that are sent to a user and relate to an event explicitly solicit a reply from the user or otherwise contain information to which the user may wish to reply. For example, an email that contains "Are you available for a call tomorrow at 12:00?" may explicitly solicit a reply from a recipient, such as a reply that confirms the recipient is available or a reply that indicates the recipient is not available and/or proposes a new time for the call. An email that contains "A few of us are going to Restaurant A after work if anybody is interested" may not explicitly solicit a reply, but a recipient that receives the email may still wish to reply to the email to confirm the recipient will also go to Restaurant A after work or will be unable to attend. Recipients of electronic communications related to an event must formulate replies to the electronic communications utilizing a user interface input device (e.g., a virtual keyboard, a microphone) and sometimes need to reference a calendar or other schedule data to determine what reply is appropriate.

SUMMARY

Some implementations of this specification are directed generally to methods and apparatus related to utilizing one or more features of an electronic communication and schedule data (e.g., an electronic calendar) of a recipient of the electronic communication to determine reply content for inclusion in a reply, by the recipient, to the electronic communication. The determined reply content may be provided for inclusion in the reply via one or more user interface output devices of a computing device of the recipient (e.g., the reply content may be automatically provided in the reply or suggested for inclusion in the reply).

Some of those implementations are directed to determining, based on feature(s) of an electronic communication sent to a user and based on schedule data of the user, one or more n-grams that are appropriate for inclusion in a reply to the electronic communication, and providing the determined n-grams for inclusion in a reply by the user to the electronic communication.

As one example, assume an email is sent to a user that includes "Want to grab dinner this Friday at 7:00?". Implementations of methods and apparatus described herein may be utilized to determine one or more n-grams for inclusion in a reply by the user to the email, where the n-grams are tailored to the email and to the schedule data of the user. For instance, if the schedule data of the user indicates the user is busy during and/or near 7:00 on Friday, "sorry, can't make it", "can't make it, have other plans", and/or other "declining responses" may be determined for providing for inclusion in the reply, whereas "sounds good", "I'll be there", and/or other "confirmatory responses" may not be determined for inclusion in the reply, or may be determined for suggesting for inclusion in the reply in a less conspicuous manner than the declining response(s). On the other hand, if the schedule data of the user indicates the user is available during and/or near 7:00 on Friday, one or more confirmatory responses may be determined for providing for inclusion in the reply, whereas one or more declining responses may not be determined for inclusion in the reply, or may be determined for suggesting for inclusion in the reply in a less conspicuous manner than the confirmatory response(s).

As another example, assume an email is sent to a user that includes "Interested in dinner on Friday?". Implementations of methods and apparatus described herein may be utilized to determine one or more n-grams for inclusion in the reply, where the n-grams are tailored to the email and to the schedule data of the user. For instance, if the schedule data of the user indicates the user is available during one or more "dinner" times on Friday, an n-gram that includes one or more of those times (e.g., "sounds good, how about 7:30?") may be suggested in lieu of, or in addition to, a general confirmatory reply.

In some implementations, the reply content may additionally and/or alternatively include a calendar invite for an event referenced in the electronic communication or an "availability poll" that is sent to the sender and/or other recipients of the electronic communication to determine a preferred time/date for the event. For example, a calendar entry of a user may be automatically created or suggested for creation based on an electronic communication sent to the user, and a corresponding calendar invite may be generated and automatically included (or suggested for inclusion) in the user's reply to the electronic communication. The invite may be sent to the sender of the communication and/or to other recipients of the communication. As another example, where an electronic communication includes "we need to have a meeting this week, let me know what time works best for everyone", schedule data of one or more recipients can be used to generate "candidate dates/times", and an availability poll provided to the sender of the electronic communication and other recipients of the communication to determine one or more preferred dates/times from the candidates. A further reply may optionally be generated that is an invite for the preferred date/time.

In various implementations, one or more user interface indications (e.g., graphical, audible) of determined reply content (e.g., textual reply content, calendar invite reply content, and/or availability poll reply content) may be presented via one or more user interface output devices of a computing device of a user generating a reply and, when the user selects one of the indications via a user interface input, the corresponding reply content may be included in the reply. For example, where the selected reply content is an n-gram, it may be included in the body of the reply. As another example, where the selected reply content is a calendar invite, the invite may be attached to the reply and/or a link to the invite may be included in the body of the reply. In some implementations, determined reply content for inclusion in a reply may be presented for inclusion in the reply before the user has provided any textual content for the reply and/or before the user has provided any other content for the reply.

In some implementations, output provided by a trained machine learning system may be utilized to determine reply content to provide for inclusion in a reply, by a user, to an electronic communication. The trained machine learning system may provide the output in response to receiving input that includes one or more message features of the electronic communication and optionally one or more user availability features based on schedule data of the user. For example, the machine learning system may be trained to receive, as input, one or more message features of an "original message" and optionally one or more features of a recipient's schedule data and to provide, as output, at least one feature related to reply content. The trained machine learning system output may be utilized to determine which reply content is provided, whether reply content is provided, and/or how the reply content is provided. For instance, the trained machine learning system may provide, as output, a likelihood that a reply to the electronic communication will include a calendar invite as reply content. Such output may be utilized to determine, for example, whether a calendar invite is provided as reply content and/or how prominently the calendar invite is suggested for inclusion in providing it as reply content. Also, for instance, the trained machine learning system may provide, as output, one or more particular n-grams and/or one or more indicators of n-grams (e.g., semantic categories of n-grams), optionally with associated scores. Such output may be utilized to determine, for example, which n-grams are provided as reply content and/or the prominences of the provided n-grams when presented.

Some implementations are directed generally toward analyzing a corpus of past electronic communications to determine relationships between: (1) one or more message features of "original" messages and optionally one or more features related to recipients' schedule data, and (2) reply content associated with "reply" messages that are replies by the recipients to the original messages. For example, the corpus may be analyzed to determine relationships between message features of original messages and a likelihood that replies to original messages having those message features include a calendar invite and/or a link to a calendar invite. Also, for example, the corpus may be analyzed to determine relationships between message features of original messages paired with features related to recipients' schedule data, and reply content included in replies, to messages having those message features, by recipients having schedule data with those features. As yet another example, the corpus may be analyzed to determine that original messages that include an event and are sent to a recipient with schedule data indicating a conflict with the event, are likely to result in a reply message that includes a "declining" textual response (e.g., "sorry, can't make it", "thanks for the invite, but I have a conflict"). As yet another example, the corpus may be analyzed to determine that original messages that include an event with a date, but no specific time, and are sent to a recipient with schedule data indicating availability on that date, are likely to result in a reply message that includes a reply message that suggests one or more times during which the recipient is available (e.g., "Sounds good. How about [available time]?", "I'd love to. Does [available time] work for you?").

In some implementations, determining relationships between one or more original message features of original messages of electronic communications and optionally one or more features related to schedule data, and reply content associated with replies to those original messages may be achieved via generating appropriate training examples and training a machine learning system based on those training examples. The machine learning system may be trained to receive, as input, one or more message features of an electronic communication and optionally one or more features of a recipient's schedule data and to provide, as output, at least one feature related to reply content, such as one of the features described above.

For example, in some implementations training examples may be generated to train a machine learning system to determine a likelihood that a reply to an original message will include an invite, a poll, and/or a link to an invite and/or poll. For instance, training examples may be generated that each have an output parameter indicative of whether an invite or a link to an invite was included in a reply message, and one or more input parameters based on the original message of a corresponding one of the electronic communications to which the reply message was responsive and optionally based on feature(s) of schedule data of the user that generated the reply message and that is temporally related to an event of the original message. For instance, a first training example may include, as an output parameter, an indication of "invite included", and as an input parameter, all or portions of the original text (and optionally annotations associated with the original text) of an original message of a corresponding first electronic communication that includes an invite in a reply message and feature(s) of schedule data of a user that generated the reply message and that is temporally related to an event in the first electronic communication. A second training example may include, as an output parameter, an indication of "invite not included", and as an input parameter, all or portions of the original text (and optionally annotations associated with the text) of a corresponding original message of a second electronic communication that does not include an invite in the reply message and feature(s) of schedule data of a user that generated the reply message and that is temporally related to an event in the second electronic communication. Additional training examples may be similarly generated.

As another example, in some implementations training examples may be generated to train a machine learning system to determine one or more features of textual reply content to include in a reply to an original message. The features of textual reply content may be defined with various levels of granularity, such as particular n-grams (e.g., "Thanks, but can't make it"), categories of textual replies (e.g., "confirmatory reply", "declining reply", "tentative reply", "confirmatory reply that suggests an available time", "tentative reply that suggests an available time"), and/or particular n-grams paired with a category of n-grams (e.g., "The [Event Type] sounds like fun, but I have a conflict", "Sounds like fun, but I have [title of conflicting schedule entry] during that time"). For instance, a first training example may include, as an output parameter, an indication of "confirmatory reply", and as an input parameter, all or portions of the original text (and optionally annotations associated with the text) of a corresponding original message of a first electronic communication that includes the confirmatory reply in a reply message and feature(s) of schedule data of a user that generated the reply message and that is temporally related to an event in the first electronic communication. A second training example may include, as an output parameter, an indication of "declining reply", and as an input parameter, all or portions of the original text (and optionally annotations associated with the text) of an original message of a corresponding second electronic communication that includes the declining reply and feature(s) of schedule data of a user that generated the reply message and that is temporally related to an event in the second communication. Additional training examples may be similarly generated.

Although examples of message features above are provided with reference to n-grams, various additional or alternative message features may be utilized. Additional and/or alternative message feature(s) include, for example: co-occurrence of two or more n-grams (optionally occurrence in a particular order, in a certain positional relationship, and/or within a certain distance of one another); features based on one or more natural language processing tags (e.g., parts of speech, named entities, tone); features based on text that occurs specifically in the subject, the first sentence, the last sentence, or other portion of the message; features based on a time the email was sent, a date the email was sent, a number of recipients, etc. As one example, the at least one message feature may be: occurrence of a particular n-gram in the subject of the original message and the occurrence of another particular n-gram in the body of the original message.

In some implementations, a computer implemented method may be provided that is performed by at least one computing device and that includes identifying an electronic communication sent to a user and determining a temporal indication associated with an event of the electronic communication. The temporal indication identifies at least a time or date associated with the event. The method further includes: searching schedule data of the user based on the temporal indication; determining, based on the searching, availability of the user for the event; and determining one or more additional message features of the electronic communication. The additional message features are in addition to the temporal indication. The method further includes generating textual reply content based on the availability of the user and based on the one or more additional message features. The textual reply content includes one or more n-grams that are not included in the electronic communication. The method further includes providing the textual reply content for inclusion in a reply electronic communication that is a reply by the user to the electronic communication.

This method and other implementations of technology disclosed herein may each optionally include one or more of the following features.

In some implementations, searching the schedule data of the user occurs independent of any textual input provided via a computing device of the user in generating the reply electronic communication, wherein the computing device of the user is one of the computing devices or is in addition to the computing devices. In some of those implementations, providing the textual reply content for inclusion in the reply electronic communication occurs independent of any textual input provided via the computing device in generating the reply electronic communication.

In some implementations, determining the temporal indication associated with the event of the electronic communication includes determining the temporal indication based on one or more temporal n-grams of the electronic communication. In some of those implementations, the method further includes: determining one or more event n-grams of the electronic communication that each reference a location of the event or a type of the event; and determining the temporal n-grams based on a syntactic relationship between the temporal n-grams and the event n-grams in the electronic communication.

In some implementations, generating the textual reply content includes generating a first reply n-gram and generating a separate second reply n-gram; and providing the reply content for inclusion in the reply electronic communication includes: providing both the first reply n-gram and the second reply n-gram for inclusion in the reply to the electronic communication. In some of those implementations, the method further includes: ranking the first reply n-gram and the second reply n-gram relative to one another; and determining, based on the ranking, a prominence for providing the first reply n-gram and the second reply n-gram. Providing the first reply n-gram and the second reply n-gram for inclusion in the reply electronic communication may include providing the first reply n-gram and the second reply n-gram with an indication of the prominences.

In some implementations, providing the textual reply content for inclusion in the reply electronic communication includes providing a graphical indication of the textual reply content and providing a graphical indication that the textual reply content is based on the availability of the user.

In some implementations, providing the textual reply content for inclusion in the reply electronic communication includes incorporating the textual reply content in the reply electronic communication without requiring confirmation by the user via user interface input initiated by the user.

In some implementations, providing the textual reply content for inclusion in the reply electronic communication includes: providing a graphical indication of the textual reply content; receiving a selection of the graphical indication via a user interface input device; and in response to receiving the selection, incorporating the textual reply content in the reply electronic communication.

In some implementations, generating the textual reply content includes generating a first reply n-gram and generating a separate second reply n-gram and providing the reply content for inclusion in the reply electronic communication includes: providing a first graphical indication of the first reply n-gram and a second graphical indication of the second reply n-gram; receiving a selection of one of the first graphical indication and the second graphical indication via a user interface input device; and in response to receiving the selection, incorporating a corresponding one of the first reply n-gram and the second reply n-gram in the reply.

In some implementations, generating the textual reply content includes: providing the additional message features and the availability of the user as input to a trained machine learning system; receiving at least one reply content feature as output from the trained machine learning system; and generating the textual reply content based on the at least one reply content feature received as output from the trained machine learning system. In some of those implementations, the additional message features include a first message feature based on an n-gram in a body of the electronic communication and the method optionally further includes: labeling each of a plurality of n-grams of the electronic communication with at least one corresponding grammatical annotation, selecting the n-gram based on the corresponding grammatical annotation of the n-gram, and determining the first message feature based on the n-gram.

In some implementations, a computer implemented method may be provided that is performed by at least one computing device and includes identifying a corpus of event electronic communications of a plurality of users. The event electronic communications of the corpus each include original content that references an event, each include reply content that is responsive to the original content, and are each associated with user availability of an author of the reply content. The user availability indicates availability of the author, when the reply content was authored, to attend the event. The method further includes generating a plurality of training examples based on the event electronic communications, wherein generating each of the training examples is based on a corresponding event electronic communication of the event electronic communications and includes: generating a plurality of input features based on the original content of the corresponding event electronic communication and the user availability associated with the corresponding reply event electronic communication, and generating at least one output feature based on the reply content of the corresponding event electronic communication. The method further includes: training a machine learning system based on the training examples to generate a trained machine learning system; receiving a new electronic communication sent to a user; generating new input features based on the new electronic communication and based on schedule data of the user; providing the new input features as input to the trained machine learning system; receiving output from the trained machine learning system in response to providing the new input features to the trained machine learning system; and using the output from the trained machine learning system to determine reply content for providing the reply content for presentation to the user via a computing device of the user for inclusion in a reply by the user to the new electronic communication.

This method and other implementations of technology disclosed herein may each optionally include one or more of the following features.

In some implementations, the at least one output feature indicates whether the reply content includes an invite or a link to an invite.

In some implementations, the at least one output feature indicates whether the reply content includes an availability poll or a link to an availability poll.

In some implementations, the at least one output feature indicates at least one textual feature of the reply content.

In some implementations, the input features of the training examples do not include any features from the reply content.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
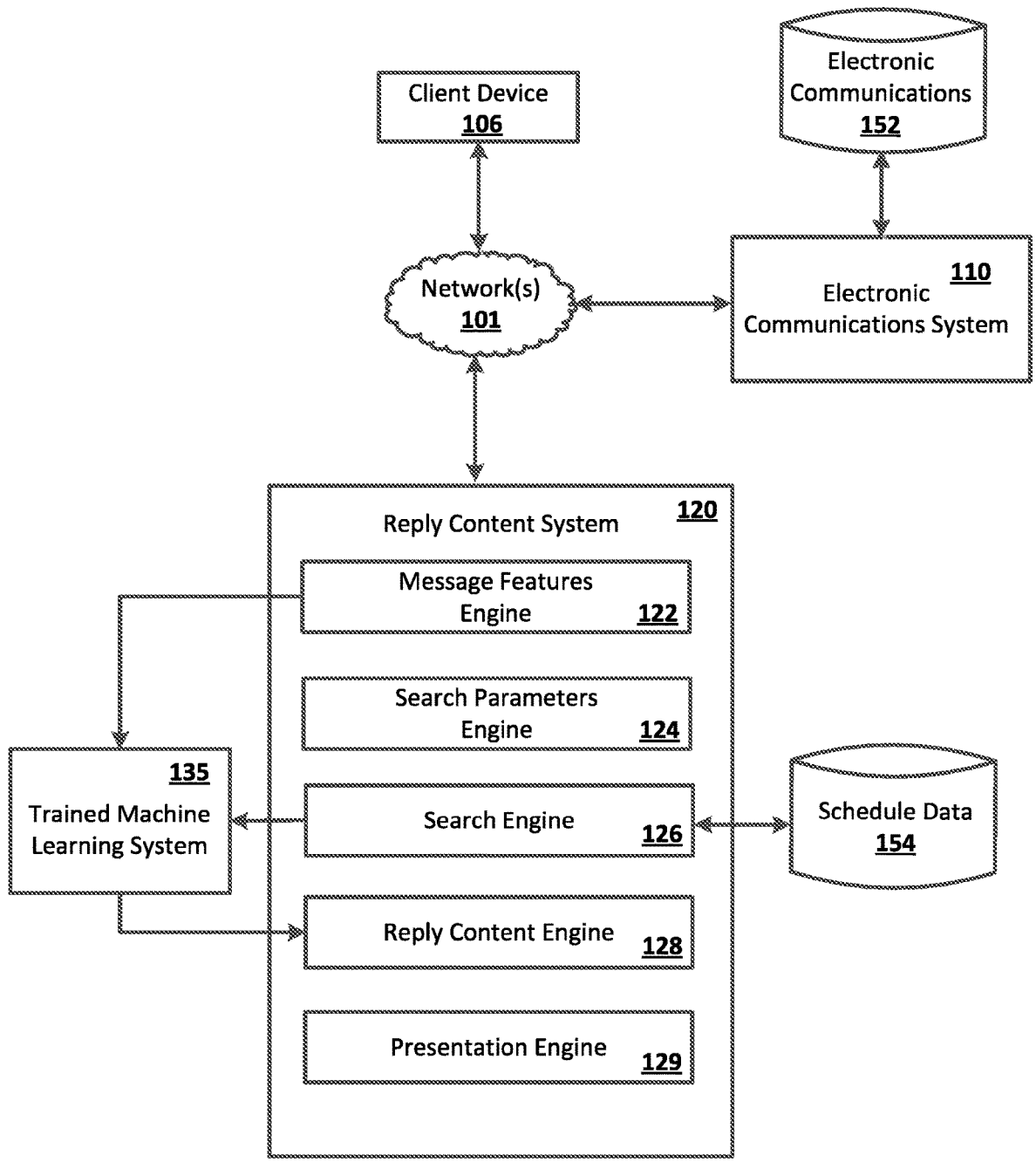
FIG. 1 illustrates an example environment in which reply content to include in a reply by a user to an electronic communication may be determined based on one or more message features of the electronic communication and based on schedule data of the user.

FIG. 1 illustrates an example environment in which reply content to include in a reply by a user to an electronic communication may be determined based on one or more message features of the electronic communication and based on schedule data of the user. The example environment includes at least one communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a client device 106, an electronic communications system 110, a reply content system 120, at least one trained machine learning system 135, schedule data 154 for one or more users, and at least one electronic communications database 152.

Electronic communications system 110, reply content system 120, and trained machine learning system 135 may each be implemented in one or more computing devices that communicate, for example, through a network (e.g., communication network 101 and/or other network). Electronic communications system 110, reply content system 120, and trained machine learning system 135 are example systems in which the systems, components, and techniques described herein may be implemented and/or with which systems, components, and techniques described herein may interface.

Electronic communications system 110, reply content system 120, and trained machine learning system 135 each include one or more memories for storage of data and software applications, one or more processors for accessing data and executing applications, and other components that facilitate communication over a network. In some implementations, electronic communications system 110, reply content system 120, and trained machine learning system 135 may include one or more components of the example computing device of FIG. 9. The operations performed by electronic communications system 110, reply content system 120, and trained machine learning system 135 may be distributed across multiple computing devices. In some implementations, one or more aspects of electronic communications system 110, reply content system 120, and/or trained machine learning system 135 may be combined in a single computing device and/or one or more aspects may be implemented on the client device 106.

Generally, in some implementations reply content system 120 determines and provides reply content to include in a reply by a user to an electronic communication that is sent to the user and that includes an event. The electronic communication may be, for example, one provided by client device 106 and/or an electronic communication of electronic communications database 152 to which the user has yet to reply. The reply content system 120 may determine the reply content based on one or more message features of the electronic communication and based on availability of the user for the event of the electronic communication and/or other user schedule data features of the user related to a time and/or date of the event. The availability of the user for the event of the electronic communication and/or other user schedule data features may be determined by searching schedule data 154 of the user based on a temporal indication (i.e., indicating a date and/or time) associated with the event. For example, the user availability may be determined based on whether the user schedule data indicates the user has an already scheduled event during or near the date and/or time associated with the event.

In some implementations, the reply content system 120 may provide the determined reply content for inclusion in a reply to an electronic communication independent of any textual input provided by the user in generating the reply to the communication and/or independent of any other content provided by the user in generating the reply to the communication. In some implementations, the reply content determined and provided by reply content system 120 includes textual reply content that is tailored to the electronic communication and tailored to the schedule data of the user. The textual reply content determined and provided for an electronic communication may include one or more n-grams that are in addition to any n-grams included in the electronic communication itself. In some implementations, the electronic communication for which the reply content system 120 determines reply content is not itself a structured invitation for an event that can be responded to with pre-defined structured responses such as "accept", "decline", and/or "tentative".

The schedule data 154 that is utilized by the reply content system 120 to determine reply content may be provided on one or more non-transitory storage media. In some implementations, the schedule data 154 of a user may be non-publicly accessible, but accessible to the user. For example, the schedule data 154 may be accessible only to the user and one or more systems and/or other users authorized by the user. The schedule data 154 of a user may indicate events from various sources. For example, events of a user indicated in schedule data 154 may be from one or more electronic calendars maintained by the user, extracted from electronic communications of the user, inferred based on past activity of the user (e.g., repeat location data that indicates the user goes to the gym every weekday at 6:00), etc. The schedule data 154 of a user may be stored at one or more locations such as one or more cloud-based locations accessible to the user, local storage device(s) of a computing device (e.g., client device 106) of the user, local network storage device(s) accessible to the computing device and/or the user, etc. As described herein, in some implementations the reply content system 120 may determine one or more features of schedule data (e.g., availability of a user) associated with an event by issuing a search of the schedule data 154 of the user, where the search includes one or more temporal search parameters (e.g., time and/or date) that are derived from an electronic communication that is sent to the user and that references the event.

The electronic communications database 152 includes one or more storage mediums that include all, or portions of, electronic communications of a plurality of users. In some implementations, the electronic communications database 152 is maintained by the electronic communications system 110. For example, the electronic communications system 110 may include one or more email systems and the electronic communications database 152 may include a plurality of emails that are sent and/or received via the email systems. As another example, the electronic communications system 110 may include one or more social networking systems and the electronic communications database 152 may include a plurality of messages, posts, or other communications that are sent and/or received via the social networking systems.

As used herein, an "electronic communication" or "communication" may refer to an email, a text message (e.g., SMS, MMS), an instant message, a transcribed voicemail, or any other electronic communication that is sent from a first user to a restricted group of one or more additional users. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth.

As used herein, "electronic communication" and "communication" will be utilized, depending on the context, to refer to both an electronic communication that includes only an original message and an electronic communication that includes one or more original messages and includes one or more reply messages. An electronic communication may be a single document such as an email that includes both an original message and a reply message and that can be processed to distinguish the original message and the reply message. Processing an electronic communication to distinguish an original message and a reply message may include one or more computing devices "splitting" the message based on presence of metadata, message breaks, header information included in the message, quotes provided around the original message, etc. An electronic communication may also be multiple documents that are mapped to one another based on at least one of the multiple documents being responsive to other of the multiple documents. For example, an electronic communication may include a first email that is an original message received by a user and a second email sent by the user as a reply to that original message, or original and reply SMS messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

As used herein, an original message is earlier in time to a responsive reply message, but is not necessarily the first message in an electronic communication. For example, an original message may be the first in time message in an electronic communication and a reply message that is responsive to that original message may be a later in time (e.g., the next in time) message. Also, for example, an original message may additionally and/or alternatively be the second, third, or fourth in time message in an electronic communication and a reply message that is responsive to that original message may be a later in time message in the electronic communication. Each of an original message and a reply message may include one or more of associated text, metadata, and/or other content (e.g., attached document(s), link(s) to document(s)).

In various implementations, reply content system 120 may include a message features engine 122, a search parameters engine 124, a search engine 126, a reply content engine 128, and/or a presentation engine 129. In some implementations, all or aspects of engines 122, 124, 126, 128, and/or 129 may be omitted. In some implementations, all or aspects of engines 122, 124, 126, 128, and/or 129 may be combined. In some implementations, all or aspects of engines 122, 124, 126, 128, and/or 129 may be implemented in a component that is separate from reply content system 120, such as client device 106 and/or electronic communications system 110.

Description of the engines 122, 124, 126, 128, and 129 is provided below with reference to an electronic communication of a user, such as an electronic communication provided by client device 106 and/or an electronic communication of electronic communications database 152 to which the user has yet to reply. Although a single electronic communication is referenced in the examples for clarity, it is understood that the reply content system 120 may determine reply content for additional electronic communications of the user and/or of additional users. In some implementations, only certain electronic communications may be processed, in whole or in part, by the reply content system 120. For example, only electronic communications that are determined by one or more classifiers and/or other machine learning systems to have at least a threshold likelihood of pertaining to an event may be processed by the reply content system 120.

The message features engine 122 determines one or more original message features based on an electronic communication sent to a user (i.e., based at least in part on the content of the electronic communication as that content was sent to the user). Various original message features may be determined. For example, message features engine 122 may determine one or more n-grams in the electronic communication as message features. For instance, one or more of the n-grams may be determined based on term frequency of the n-gram in the electronic communication (i.e., how often the n-gram occurs in the electronic communication) and/or inverse document frequency of the n-gram in a collection of documents (i.e., how often the n-gram occurs in a collection of documents, such as a collection of electronic communications).

Also, for instance, one or more of the n-grams may be determined based on the n-grams being "event n-grams" that reference a location of an event (e.g., "Restaurant", a name of a particular venue, a particular address) and/or a type of an event (e.g., "dinner", "meeting", "videoconference"). Also, for instance, one of more of the n-grams may be determined based on the n-grams being temporal n-grams that reference a date and/or a time (e.g., "today", "Thursday", "11:00", "tonight", "morning"). In various implementations, one or more classifiers and/or other machine learning systems may be utilized to provide an indication of one or more n-grams of an electronic communication that are likely temporal n-grams and/or event n-grams.

Also, for instance, one or more of the n-grams may be determined based on positional proximity and/or a syntactic relationship of the n-gram to one or more other n-grams. For example, a temporal n-gram may be identified based on its positional proximity and/or syntactic relationship to one or more event n-grams, such as an event n-gram that references a location or type of an event. As yet another instance, one or more of the n-grams may be determined based on a part of speech of the n-gram (e.g., "noun"), a type of the n-gram (e.g., "person", "place", or "thing") or based on the n-gram being included in a listing of potentially relevant n-grams and/or not being included in a listing of irrelevant n-grams (e.g., stop words such as "an", "a", and "the").

Also, for example, message features engine 122 may determine co-occurrence of two or more n-grams in the electronic communication as a message feature, such as co-occurrence in a particular order (e.g., a first n-gram before a second n-gram), in a certain positional relationship (e.g., within n terms or characters of one another), etc. Also, for example, message features engine 122 may determine one or more message features based on one or more natural language processing tags or other labels applied to text of the electronic communication (e.g., parts of speech, named entities, entity types, tone); features based on text that occurs specifically in the subjects, the first sentences, the last sentences, or other portion of the electronic communication; features based on metadata of the electronic communication such as a time the electronic communication was sent, day of the week the electronic communication was sent, a number of recipients, a type of device that sent the electronic communication, etc.

Also, for example, message features engine 122 may determine an embedding vector of one or more features from the entire electronic communication or a subset of the electronic communication (e.g., one or more paragraphs, one or more sentences, one or more words). The features of the embedding vector may include one or more n-grams, labels applied to one or more n-grams, syntactic features, semantic features, metadata features, and/or other features.

As one specific example, assume the electronic communication includes a subject with the text "golf trip" and a body with the text "We need to meet and plan our annual golf trip. How about this Thursday at 6:00?" The message features engine 122 may determine message features that include the n-grams "trip", "golf trip", "this Thursday", "6:00", "annual", "How about", and "?", while optionally excluding other n-grams. For example, the message features engine 122 may determine "trip" and "golf trip" as message features based on them being event n-grams (event type), may determine "this Thursday" and "6:00" as message features based on them being temporal n-grams and/or based on them being in close positional proximity to the event n-grams, may determine "how about" and "?" as message features based on them being inquiry n-grams, and may determine "annual" as an n-gram based on it being an adjective in the text and/or based on it being in close positional proximity to an event n-gram.

The message features engine 122 provides determined message features to search parameters engine 124 and optionally to trained machine learning system 135 and/or reply content engine 128. The message features engine 122 may provide the same message features to search parameters engine 124, trained machine learning system 135, and/or reply content engine 128—or the provided message features may differ.

The search parameters engine 124 generates, based on one or more of the message features provided by message features engine 122, one or more search parameters for searching schedule data 154 of the user. For example, the message features engine 122 may provide the search parameters engine 124 with at least temporal n-grams and/or event n-grams of the message features and the search parameters engine 124 may generate one or more search parameters based on the temporal and/or event n-grams.

As one example of generating search parameters based on one or more of the message features provided by message features engine 122, assume the message features engine 122 provides a group of message features that include the n-grams "this Thursday", "6:00", and "golf trip". The search parameters engine 124 may generate a temporal search parameter based on "this Thursday" and "6:00". For example, the search parameters engine 124 may convert "this Thursday" to a particular date and use the particular date as a temporal search parameter. Also, for example, the search parameters engine 124 may generate a time range of 5:00-8:00 based on "6:00" and use the time range as a temporal search parameter. The time range of 5:00-8:00 may provide for searching of schedule data 154 of the user to ascertain availability of the user for an hour before and two hours after the particular time (6:00) referenced. The search parameters engine 124 may also optionally generate an additional "negative" search parameters of "does not include 'golf'" to prevent determining the availability of the user as "busy" if schedule data of the user already indicates the event of the electronic communication (e.g., the user may have talked to the sender in advance of receiving the email and already manually added the event to the user's calendar).

The search engine 126 searches schedule data 154 of the user based on the search parameters determined by search parameters engine 124. In some implementations, searching schedule data 154 of the user may include searching one or more indexes that index a calendar and/or other schedule data of the user. The search engine 126 identifies whether any entries in the schedule data 154 of the user match the search parameters and optionally identifies one or more properties of those entries.

Based on whether any entries match the search parameters and/or one or more properties of those entries, the search engine 126 determines availability of the user for the event of the electronic communication. For example, where no entries of schedule data 154 of the user match the search parameters, the search engine 126 may determine the availability of the user is "available". Also, for example, where one or more entries of schedule data 154 of the user fully matches the search parameters (e.g., the one or more entries indicate the user is busy during the entire temporal period specified), the search engine 126 may determine the availability of the user is "unavailable". In some of those situations, the search engine 126 may also include with the availability of the user, one of more of the properties of the entries of the schedule data 154 of the user that match the search parameters. For instance, the search engine 126 may determine availability of the user that includes an indication of "unavailable", and may include, with the availability of the user, the title of an entry that matches the search parameters and/or a time range for the entry that matches the search parameters.

As another example, where one or more entries of schedule data 154 of the user partially matches the search parameters (e.g., the one or more entries indicate the user is busy during a portion of the temporal period specified), the search engine 126 may determine the availability of the user is "potentially unavailable". In some of those situations, the search engine 126 may also include, with the availability of the user, one of more of the properties of the entries that match the search parameters. For instance, the search engine 126 may determine availability of the user that includes an indication of "potentially unavailable", and include with the availability of the user, the time range(s) during which the user is unavailable (e.g., the time(s) associated with one or more entries that partially match the temporal period specified). As yet another example, where an entry of schedule data 154 of the user fully matches the search parameters, but is indicated as a "tentative" or otherwise "flexible" entry, the search engine 126 may determine the availability of the user is "potentially unavailable". In some of those situations, the search engine 126 may also include, with the availability of the user, one of more of the properties of the entry that matches the search parameters.

In some implementations, the search engine 126 issues multiple searches in searching schedule data 154 of the user based on the search parameters determined by search parameters engine 124. For example, assume an electronic communication that includes "1/1/16 from 11:00 AM-12:00 PM". In some implementations, the search parameters engine 124 may generate search parameters of "1/1/16", "11:00 AM-12:00 PM" and "potential conflict" search parameters of "10:00 AM-11:00 AM" and "12:00 PM-1:00 PM" to check for potential conflicts on either side of the specified temporal period. In some of those implementations, the search engine 126 may issue three separate searches, e.g.: (1) {"1/1/16", "11:00 AM-12:00 PM"}, (2) {"1/1/16", "12:00 PM-1:00 PM"}, and (3) {"1/1/16", "10:00 AM-11:00 AM"}. If the search engine 126 determines that no entries of schedule data 154 of the user match any of the searches, the search engine 126 may determine the availability of the user is "available". If the search engine determines that an entry of schedule data 154 of the user matches search (1), the search engine 126 may determine the availability of the user is "unavailable". If the search engine determines that an entry of schedule data 154 of the user matches search (2) or search (3), but does not match search (1), the search engine 126 may determine the availability of the user is "potentially unavailable".

The search engine 126 provides, to the reply content engine 128 and/or the trained machine learning system 135, an indication of the availability of the user for the event of the electronic communication, and optionally one or more of the properties of scheduling entries, if any, that match the search(es) of the search engine 126. The reply content engine 128 determines reply content for inclusion in a reply, by the user, to the electronic communication. The reply content may include, for example, one or more textual n-grams responsive to the event of the electronic communication, a calendar invite for the event, and/or an availability poll that is sent to the sender and/or other recipients of the electronic communication to determine a preferred time/date for the event.

In various implementations, the reply content engine 128 determines the reply content based on one or more message features determined by message features engine 122 and based on the availability of the user and/or other properties of schedule data provided by search engine 126. For example, the reply content engine 128 may directly utilize the message features and/or the availability of the user and/or other schedule data in determining the reply content and/or may utilize output from the trained machine learning system 135, where the output is based on the message features and/or the availability of the user and/or other schedule data.

As one example, the trained machine learning system 135 may be trained to receive, as input, one or message features and/or features related to availability of the user and/or other schedule data and to provide, as output, one or more reply content features indicative of whether reply content should be provided and/or the content of reply content to be provided. For example, the trained machine learning system 135 may be trained to provide, as output, one or more particular textual n-grams and/or categories of textual n-grams based on received input of message features and/or indication of availability of the user.

For instance, the trained machine learning system 135 may receive, as input, both the message features and the features related to availability of the user and provide, as output, one or more particular textual n-grams (e.g., "That time works for me"), and optionally scores for those particular textual n-grams. The reply content engine 128 may select one or more of the outputted particular textual n-grams for utilization as the reply content. The reply content engine 128 may optionally select the particular textual n-grams and/or rank the particular textual n-grams (e.g., for determining prominence for those n-grams) based on the optional scores provided by the trained machine learning system 135.

Also, for instance, the trained machine learning system 135 may receive, as input, both the message features and the features related to availability of the user and provide, as output, one or more particular n-grams paired with a category of n-grams (e.g., "The [Event Type] sounds like fun, but I have a conflict", "Sounds good. How about [available time]?"), and optionally scores for those particular n-grams paired with a category of n-grams. The reply content engine 128 may determine appropriate text for filling in the category of n-grams based on one or more of the message features (e.g., [Event Type] may be filled in with "party" based on event message features derived from a "party" electronic communication). The reply content engine 128 may utilize the particular n-gram with the filled in text as the reply content. The reply content engine 128 may optionally rank multiple filled in or otherwise generated n-grams based on the optional scores provided by the trained machine learning system 135.

As yet another instance, the trained machine learning system 135 may receive, as input, the message features and not the features related to availability of the user and provide, as output, one or more categories of textual n-grams (e.g., "informal confirmatory replies", "informal tentative replies", "informal declining replies" "confirmatory reply that suggests an available time", "tentative reply that suggests an available time") and optionally scores for those categories of textual n-grams. The reply content engine 128 may utilize the availability of the user to select one or more of the category of replies and/or to rank the category of replies, and determine textual content that conforms to the selected category of replies (e.g., previous textual replies crafted by the user that conform to the category). For instance, if the availability of the user is "potential conflict", then the reply content engine 128 may utilize that availability to determine textual content that conforms to "informal tentative replies" and/or utilize that availability to rank textual content that conforms to the category more prominently than textual content that conforms to other categories.

As another example, the trained machine learning system 135 may be trained to provide, as output, one or more reply content features indicative of whether reply content should be provided based on received input of message features and/or features related to availability of the user and/or other schedule data.

For instance, the trained machine learning system 135 may receive, as input, both the message features and the indication of availability of the user and/or other schedule data and provide, as output, a likelihood that a reply electronic communication will include a calendar invite and/or a likelihood that a reply electronic communication will include an availability poll. The reply content engine 128 may determine whether and/or how a calendar invite and/or an availability poll should be included in reply content based on the output provided by the trained machine learning system 135. For example, if the output is likelihood that a reply electronic communication will include a calendar invite, reply content engine 128 may determine the reply electronic communication is to be provided for automatic inclusion in a reply if the likelihood satisfies a threshold, but may require that user interface input be provided before the calendar invite is provided for inclusion in the reply if the likelihood does not satisfy the threshold. Also, for example, the reply content engine 128 may: if the likelihood is greater than or equal to X (e.g., X=0.8), determine the calendar invite is to be provided for automatic inclusion in a reply before any user interface input has been provided indicating a desire to reply; may, if the likelihood is less than X and greater than or equal to Y (e.g., Y=0.5), require user interface input require that user interface input be provided before the calendar invite is provided for inclusion in the reply; and may, if the likelihood is less than Y, determine that the calendar invite should not be provided for inclusion in the reply.

The reply content engine 128 provides the reply content it determined for inclusion in the reply, and optionally data indicating how it should be included in the reply, to the presentation engine 129. The presentation engine 129 provides the reply content for inclusion in a reply electronic communication that is a reply by the user to the electronic communication.

Providing reply content for inclusion in a reply may include, for example, embedding the reply content, providing a link to the reply content, providing a user interface indication of the reply content, etc. For example, the presentation engine 129 may automatically attach a calendar invite to the reply and/or automatically incorporate a link to the calendar invite in the reply. Also, for example, the presentation engine 129 may present one or more user interface indications (e.g., graphical, audible) of the reply content and, when a user generating the reply selects one of the indications via user interface input, the corresponding reply content may be automatically provided in the reply.

In some implementations, the presentation engine 129 provides the reply content independent of any textual input and/or other content provided via a computing device of the user in generating a reply to the electronic communication. In some of those implementations, the reply content engine 128 determines the reply content before the user has even viewed or otherwise consumed the communication. For example, the reply content system 120 may process a communication in advance of viewing by the user, reply content engine 128 may determine reply content for inclusion in a reply to the communication, and append or otherwise associate reply content with the electronic communication (e.g., append the reply content to an entry for the electronic communication in electronic communications database 152) before it is even viewed by the user.

In some implementations, the presentation engine 129 may provide multiple distinct reply content options for inclusion in a reply. For example, a first n-gram of "Sorry, but I have a conflict" and a second n-gram of "Sounds good. I'll be there" may both be provided. Also, for example, a first n-gram of "Sounds good. I'll be there" and a calendar invite may both be provided. In some of those implementations, the multiple reply content options may be provided based on the optional data (provided by the reply content engine 128) indicating how it should be included in the reply. For example, a presentation prominence for each of the multiple reply content options may be determined based on the data and the multiple documents provided for potential inclusion in the reply to the electronic communication, along with an indication of the presentation prominences. Also, for example, where the reply content engine 128 provides indication(s) of which of one or more multiple reply content options is most appropriate for inclusion in a reply based on the schedule data, the presentation engine 129 may include a graphical and/or textual representation of such indication(s) for presentation along with the reply content option(s) (e.g., a textual indication of "selected based on your calendar" or "your calendar indicates a conflict for this event").

In some implementations where the electronic communication is provided to the reply content system 120 by the client device 106, the presentation engine 129 may provide the reply content to the client device 106 for presentation to the user as an option for including in a reply. In some implementations where the electronic communication is provided to the reply content system 120 by the electronic communications system 110 via the electronic communications database 152, the presentation engine 129 may store an association of the reply content with the electronic communication in the electronic communications database 152 and/or other database. In some implementations, one or more (e.g., all) aspects of the presentation engine 129 may be implemented by the client device 106 and/or the electronic communications system 110.

The presentation engine 129 may also provide display prominence information with the determined reply content that indicates the prominence (e.g., position, size, color) with which the selected reply content should be presented. As one example, where multiple distinct reply content options are provided by the presentation engine 129, the presentation engine 129 may provide an indication of the ranking of those multiple reply content options for use in determining in which order the multiple reply content options should be presented to a user via a user interface output device of the client device 106. The presentation engine 129 may also provide, for presentation along with the reply content, graphical and/or textual representations indicating the reply content was determined based on the schedule data (e.g., a textual indication of "selected based on your calendar" or "your calendar indicates you are available for this event"). In some implementations, the presentation engine 129 provides only identifier(s) of reply content, and potentially prominence information and/or graphical and/or textual representations indicating the reply content was determined based on the schedule data, and the client device 106 and/or electronic communications system 110 may generate a display of the selected documents based on the provided data. In some implementations, the presentation engine 129 may additionally provide some or all of the data necessary to generate the display. In some of those implementations, any provided prominence information and/or graphical and/or textual representations may be incorporated in the data that indicates how the display should be presented.

Figure 2:
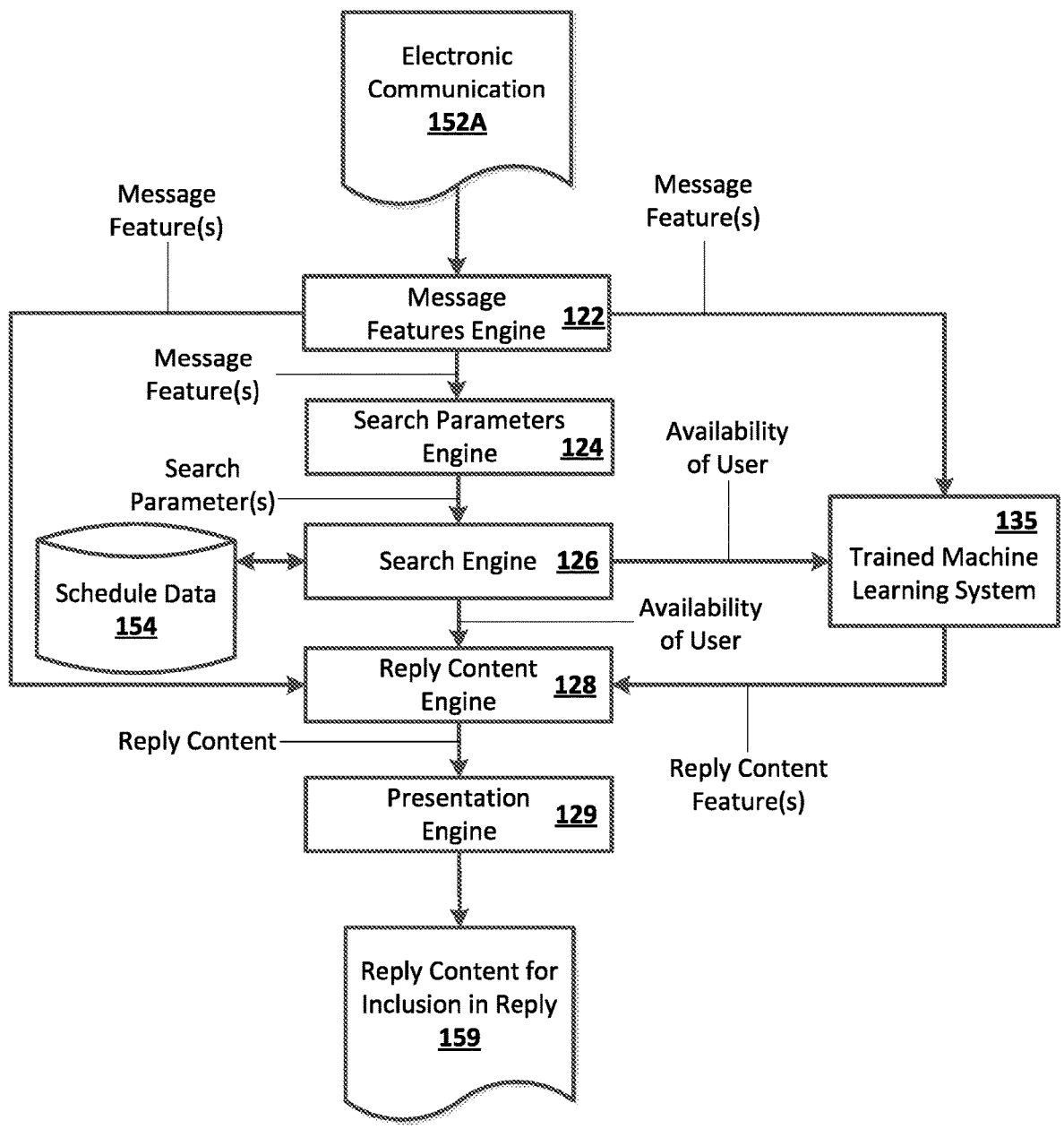
FIG. 2 illustrates an example of how reply content to include in a reply by a user to an electronic communication may be determined based on one or more message features of the electronic communication and based on schedule data of the user.

FIG. 2 illustrates an example of how reply content to include in a reply by a user to an electronic communication may be determined based on one or more message features of the electronic communication and based on schedule data of the user. Message features engine 122 determines one or more message features of an electronic communication 152A sent to a user. Electronic communication 152A may be provided by, for example, client device 106 or electronic communications system 110 of FIG. 1.

The message features engine 122 provides one or more of the determined message features to search parameters engine 124 and provides one or more of the determined message features to the trained machine learning system 135 and to the reply content engine 128. The message features provided by the message features engine 122 to the search parameters engine 124, the reply content engine 128, and/or the trained machine learning system 135 may be the same, or may differ.

The search parameters engine 124 generates, based on one or more of the message features provided by message features engine 122, one or more search parameters for searching schedule data 154 of the user. For example, the message features engine 122 may provide the search parameters engine 124 with at least temporal n-grams and/or event n-grams of the message features and the search parameters engine 124 may generate one or more search parameters based on the temporal and/or event n-grams.

The search engine 126 searches schedule data 154 of the user based on the search parameters determined by search parameters engine 124. The search engine 126 identifies whether any entries in the schedule data 154 of the user match the search parameters and optionally identifies one or more properties of those entries. Based on whether any entries match the search parameters and/or one or more properties of those entries, the search engine 126 determines availability of the user for the event of the electronic communication.

The search engine 126 provides, to the reply content engine 128 and/or the trained machine learning system 135, an indication of the availability of the user for the event of the electronic communication, and optionally one or more of the properties of scheduling entries, if any, that match the search(es) of the search engine 126.

The trained machine learning system 135 may be trained to receive, as input, one or message features and/or features related to availability of the user and/or other schedule data and to provide, as output, one or more reply content features indicative of whether reply content should be provided and/or the content of reply content to be provided. For example, the trained machine learning system 135 may be trained to provide, as output, one or more particular textual n-grams and/or categories of textual n-grams based on received input of message features and/or indication of availability of the user.

The reply content engine 128 determines reply content for inclusion in a reply, by the user, to the electronic communication. The reply content may include, for example, one or more textual n-grams responsive to the event of the electronic communication, a calendar invite for the event, and/or an availability poll that is sent to the sender and/or other recipients of the electronic communication to determine a preferred time/date for the event.

In various implementations, the reply content engine 128 determines the reply content based on the reply content features provided by the trained machine learning system 135 and optionally based on one or more of the message features provided by message features engine 122 and/or based on the availability of the user and/or other properties of schedule data provided by search engine 126.

The presentation engine 129 provides the reply content 159 for inclusion in a reply electronic communication that is a reply by the user to the electronic communication. Providing reply content for inclusion in a reply may include, for example, automatically populating the reply content in the reply, providing a user interface indication of the reply content that, when selected, populates the reply content in the reply, etc.

Figure 3:
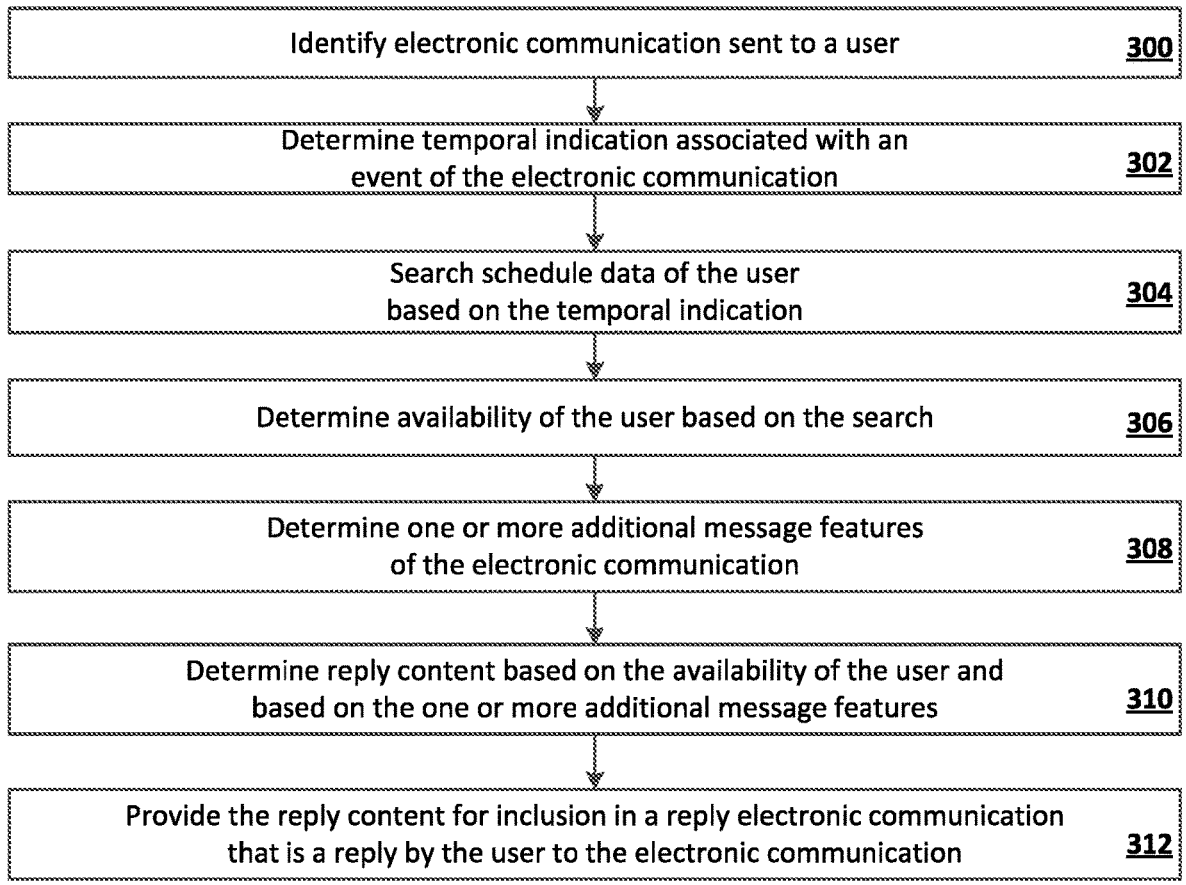
FIG. 3 is a flow chart illustrating an example method of determining reply content to include in a reply by a user to an electronic communication based on one or more message features of the electronic communication and based on schedule data of the user.

FIG. 3 is a flow chart illustrating an example method of determining reply content to include in a reply by a user to an electronic communication based on one or more message features of the electronic communication and based on schedule data of the user. For convenience, the operations of the flow chart are described with reference to a system that performs the operations. This system may include various components of various computer systems. For instance, some operations may be performed by one or more components of the reply content system 120, such as engines 122, 124, 126, 128, and/or 129. Moreover, while operations of the method of FIG. 3 are shown in a particular order, this is not meant to be limiting. One or more operations may be reordered, omitted or added.

At block 300, the system identifies an electronic communication sent to a user.

At block 302, the system determines a temporal indication associated with an event of the electronic communication.

At block 304, the system searches schedule data of the user based on the temporal indication of block 302.

At block 306, the system determines availability of the user based on the search of block 304.

At block 306, the system determines one or more additional message features of the electronic communication. Various message features may be utilized such as textual, semantic, and/or syntactic features. For example, the system may determine message features based on one or more n-grams in the electronic communication, co-occurrence of two or more n-grams in the electronic communication, features based on n-gram(s) that occur specifically in the subjects, the first sentences, the last sentences, or other portion of the electronic communication, features based on metadata of the electronic communication, etc.

At block 310, the system determines reply content based on the availability of the user of block 306 and based on the one or more additional message features of block 308.

At block 312, the system provides the reply content for inclusion in a reply electronic communication that is a reply by the user to the electronic communication.

Figure 4A:
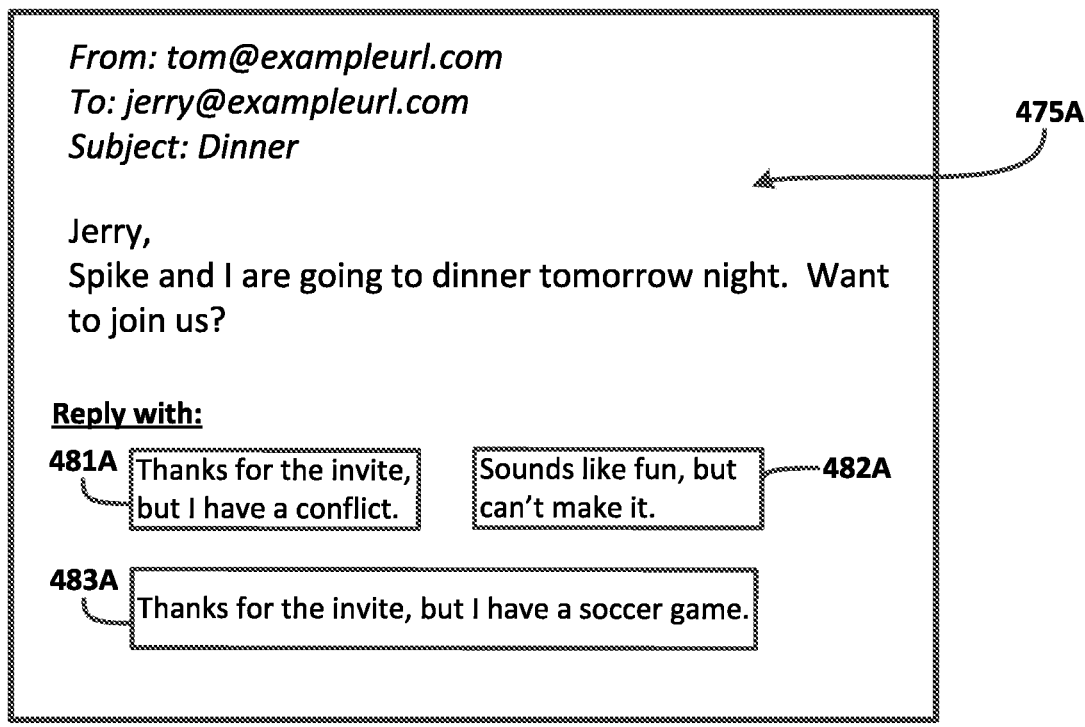
FIGS. 4A-4C illustrate example graphical user interfaces for providing reply content for inclusion in a reply to an electronic communication.
Figure 4B:
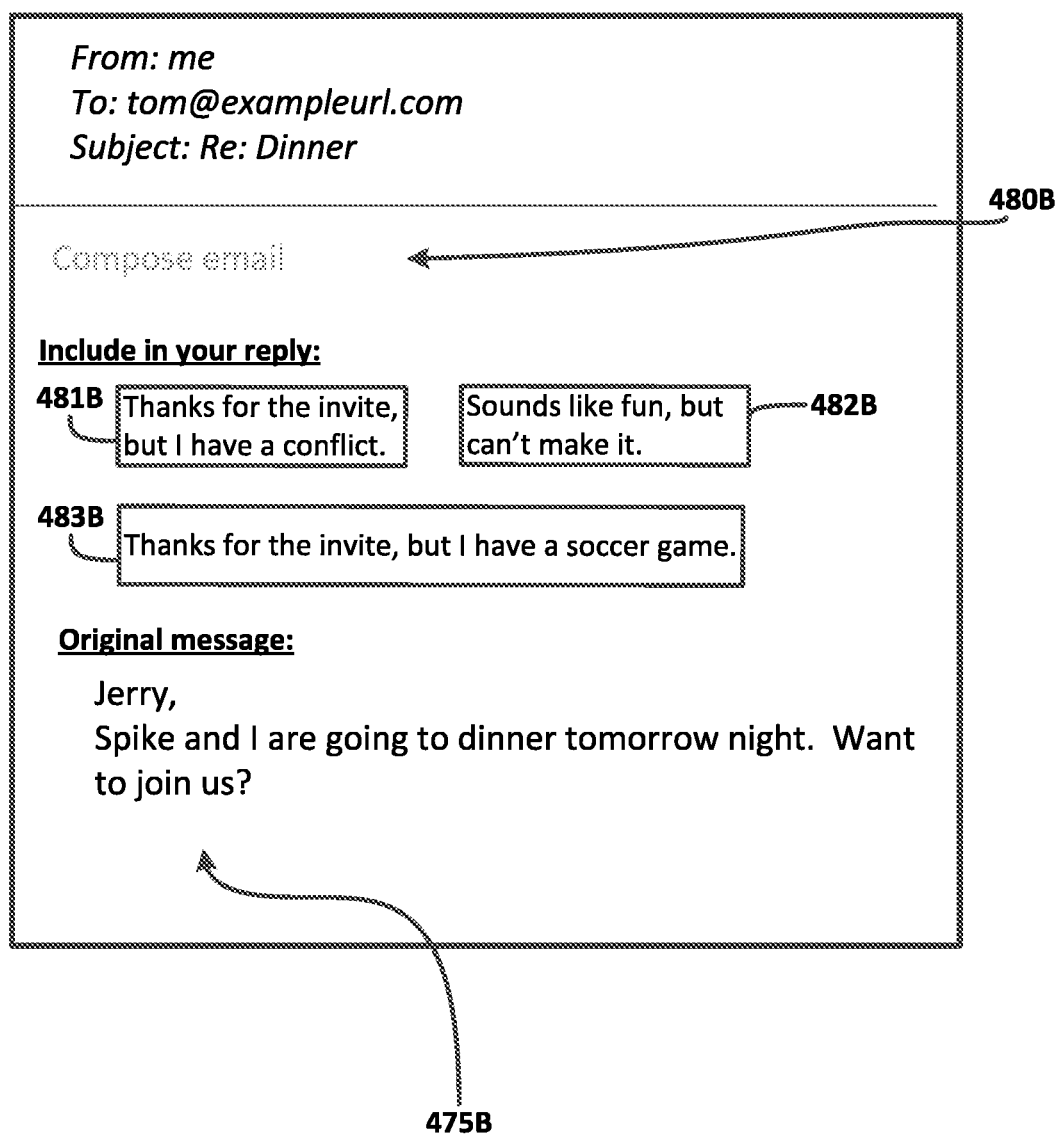
Figure 4C:
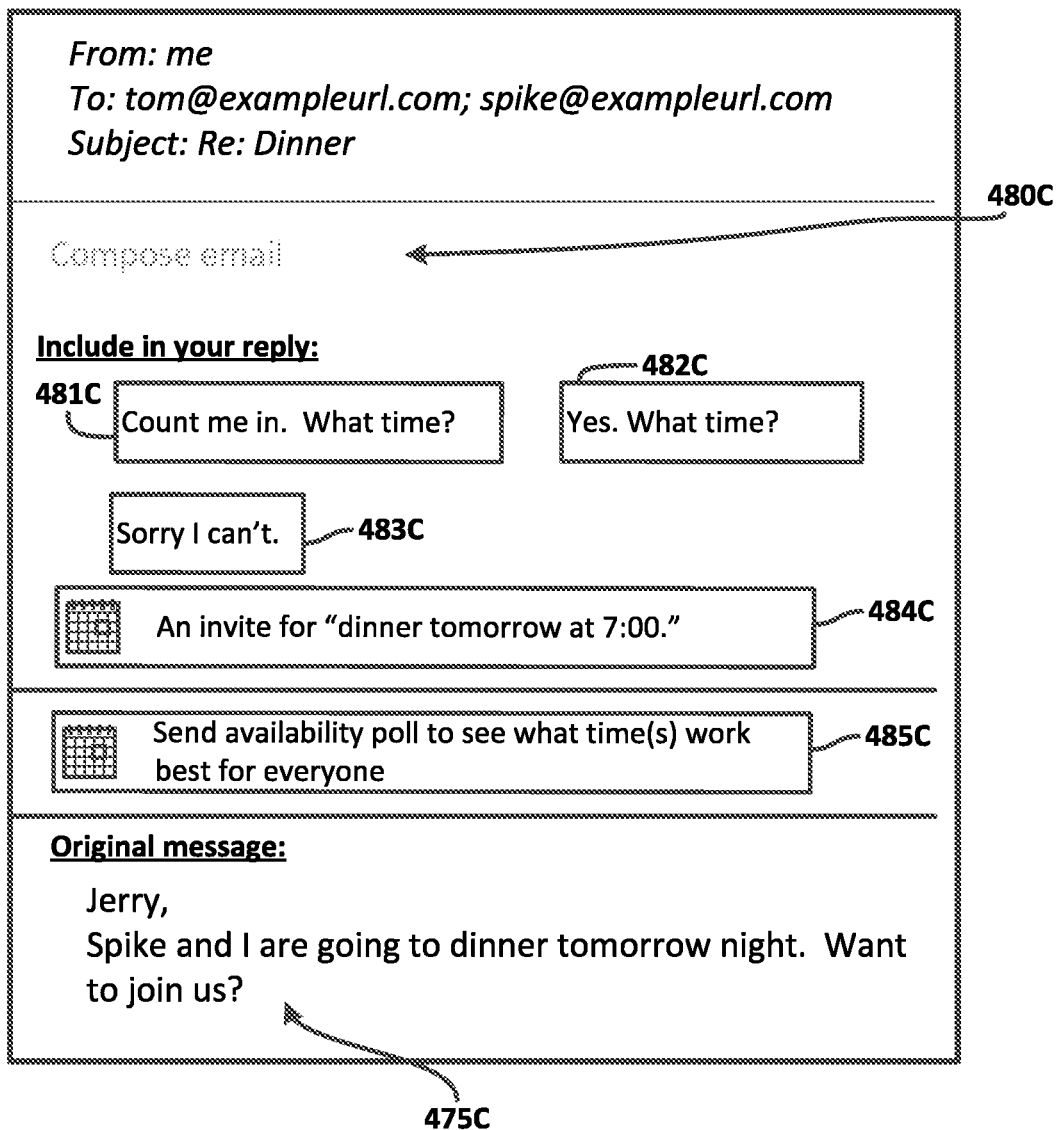

FIGS. 4A-4C illustrate example graphical user interfaces for providing reply content for inclusion in a reply to an electronic communication. The graphical user interfaces of FIGS. 4A-4C may be presented at client device 106 based on reply content that is determined and provided by reply content system 120. In some implementations, one or more aspects of reply content system 120 (e.g., all or aspects of presentation engine 129) may be incorporated, in whole or in part, on client device 106.

In FIG. 4A, an original email 475A that has been sent to a user is being viewed by the user, before the user has provided any user interface input to indicate a desire to reply to the original email 475A. The reply content options represented by graphical user interface elements 481A, 482A, and 483A are presented for inclusion in a reply to the email and, when selected via user interface input, are included in the reply. For example, a user selection of graphical user interface element 481A may automatically present to the user an editable reply email that includes the n-gram "Thanks for the invite, but I have a conflict." incorporated in the body of the reply email. Likewise, a user selection of graphical user interface element 482A may automatically present to the user an editable reply email that includes the n-gram "Sounds like fun, but can't make it." incorporated in the body of the reply email.

In FIG. 4A, the reply content options represented by graphical user interface elements 481A, 482A, and 483A are determined based on the original email 475A and based on schedule data of the user to which the original email 475A was sent. In the example of FIG. 4A, the schedule data of the user includes a pre-existing entry with a title of "soccer game" that is scheduled from 6:30-8:00 "tomorrow night." Based on the schedule data and the original email 475A, the "declining reply" graphical user interface elements 481A, 482A, and 483A may be determined as appropriate for providing to the user.

As one example, one or more message features of the original email 475A may be provided as input to the trained machine learning system 135 of FIG. 1 and the trained machine learning system 135 may provide, as output, an indication that a "confirmatory reply", "tentative reply", and "declining reply" are appropriate responses based on the message features. The reply content engine 128 of FIG. 1 may utilize that output, and the schedule data of the user, to determine that "declining replies" are appropriate. For example, the reply content engine 128 may determine that the user is unavailable based on the schedule data of the user, and, as a result of the user's unavailability, select only declining replies or determine declining replies should be provided more prominently. The particular declining replies represented by graphical user interface elements 481A, 482A, and 483A may be selected by the reply content engine 128 from a database of declining replies, such as past declining replies of the user. It is noted that the declining reply represented by graphical user interface element 481A includes a title ("soccer game") of the entry of the schedule data of the user that conflicts with the event of the original email 475A. This title may be filled in to a "conflicting event" category of one of the declining replies of the database by the reply content engine 128.

As another example, one or more message features of the original email 475A and an "unavailable" feature of the schedule data of the user may be provided as input to the trained machine learning system 135 of FIG. 1 and the trained machine learning system 135 may provide, as output, "Thanks for the invite, but I have a conflict", "Sounds like fun, but can't make it", and "Thanks for the invite, but I have a [conflicting event title]". The reply content engine 128 of FIG. 1 may utilize that output to generate the particular declining replies represented by graphical user interface elements 481A, 482A, and 483A. It is noted that the "[conflicting event title]" category may be filled in with "soccer game" by the reply content engine 128. In some implementations a graphical and/or textual representation may be presented in combination with the user interface elements 481A, 482A, and 483A that indicates those elements were selected based on schedule data of the user (e.g., a textual indication of "selected based on your calendar" or "your calendar indicates a conflict for this event").

In FIG. 4B, a user has provided user interface input (e.g., selecting a "reply" graphical user interface element) to initiate a reply to an original email and is presented with a reply section 480B that includes phantom text "Compose email" indicating to the user that the user can compose a reply in the reply section 480B. The original email 475B to which the reply is responsive is also illustrated in FIG. 4B for reference of the user in generating the reply.

Graphical user interface elements 481B, 482B, and 483B are presented in FIG. 4B for inclusion in the reply of associated textual n-grams determined based on the original email 475B and based on schedule data of the user (e.g., as described above with respect to FIG. 4A). The graphical user interface elements 481B, 482B, and 483B are presented before the user has provided any textual input or other content for the reply. The original email 475B of FIG. 4B is the same as the original email 475A of FIG. 4A and the graphical user interface elements 481B, 482B, and 483B of FIG. 4B are the same as the graphical user interface elements 481A, 482A, and 483A of FIG. 4A. In some implementations, the graphical user interface elements 481B, 482B, and 483B of FIG. 4B may be determined as described above with respect to FIG. 4A.

In FIG. 4C, an original email 475C that has been sent to a user is being viewed by the user, before the user has provided any user interface input to indicate a desire to reply to the original email 475C. The original email 475C of FIG. 4C is the same as the original emails 475A and 475B of FIGS. 4A and 4B. However, in the example of FIG. 4C, the schedule data of the user does not include a conflict for "tomorrow night".

In FIG. 4C, the reply content options represented by graphical user interface elements 481C, 482C, 483C, 484C, and 485C are determined based on the original email 475C and based on schedule data of the user. Based on the schedule data and the original email 475C, the "confirmatory reply with time request" graphical user interface elements 481A and 482A may be determined as appropriate for providing to the user and may be determined as appropriate for providing more prominently than the "declining reply" graphical user interface element 483C. Moreover, the graphical user interface elements 484C and 485C may be determined as appropriate based on the schedule data and the original email 475C. In some implementations a graphical and/or textual representation may be presented in combination with the user interface elements 481C and 482C that indicates those elements were selected based on schedule data of the user (e.g., a textual indication of "selected based on your calendar" or "your calendar indicates you are free tomorrow night").

When graphical user interface element 484C is selected via user interface input, an invite may be generated for "tomorrow" at "7:00 PM" with a title of "dinner". In response to the selection, the invite may be included in the reply (e.g., the invite attached to the reply and/or a link to the invite embedded in the reply) and may be sent to the sender of the original email 475C (tom@exampleurl.com) and/or the other recipient of the original email 475C (spike@exampleurl.com). When graphical user interface element 485C is selected via user interface input, an availability poll may be generated based on the schedule data of the user that includes a plurality of selectable times during which the user is available as indicated by the schedule data. In response to the selection, the availability poll may be included in the reply (e.g., the availability poll attached to the reply and/or a link to the availability poll embedded in the reply) and may be sent to the sender of the original email 475C (tom@exampleurl.com) and/or the other recipient of the original email 475C (spike@exampleurl.com). Based on selections of the sender and/or other recipient, a preferred date/time may be determined and a further reply may optionally be generated that is an invite for the preferred date/time.

In some implementations, including the invite or the availability poll in the reply includes including only the invite or the availability poll in the reply. In some other implementations, including the invite or the availability poll in the reply includes including them along with other content in the reply. For example, in some implementations user interface input may be utilized to select graphical user interface element 481C and to select graphical user interface element 484C, thereby generating a reply that includes the n-gram "Count me in." and includes an invite.

As one example of determining the reply content represented by graphical user interface elements 481C, 482C, and 483C, one or more message features of the original email 475C may be provided as input to the trained machine learning system 135 of FIG. 1 and the trained machine learning system 135 may provide, as output, an indication that a "confirmatory reply with time request", "tentative reply with time request", and "declining reply" are appropriate responses based on the message features. The reply content engine 128 of FIG. 1 may utilize that output, and the schedule data of the user, to determine that "confirmatory replies with time requests" are most appropriate. For example, the reply content engine 128 may determine that the user is available based on the schedule data of the user, and, as a result of the user's availability, determine the confirmatory replies with time requests "Yes. What time?" and "Count me in. What time?" should be provided more prominently than the declining reply "Sorry I can't". The particular confirmatory replies with time requests represented by graphical user interface elements 481C, 482C, and 483C may be selected by the reply content engine 128 from a database of declining replies, such as past confirmatory replies with time requests of the user. It is noted that if the original email 475C included a specified time (e.g., "Spike and I are going to dinner tomorrow night at 7:00. Want to join us?") the machine learning system 135 may determine, based on message features of the original email 475C, that "confirmatory replies" are appropriate, instead of confirmatory replies "with time requests".

As one example of determining the reply content represented by graphical user interface elements 484C and 485C, one or more message features of the original email 475A may be provided as input to the trained machine learning system 135 of FIG. 1 (the same system as referenced in the example above, or a separately trained system) and the trained machine learning system 135 may provide, as output, an indication that an "invite for a free time of the user" and an "availability poll" are appropriate responses based on the message features. The reply content engine 128 of FIG. 1 may utilize that output, and the schedule data of the user and optionally other users (when access is available), to determine that the user and/or other users are available for dinner tomorrow at 7:00—and generate the invite represented by graphical user interface element 484C based on the availability. In some implementations, the reply content engine 128 may also determine 7:00 as an appropriate time based on user history data, for the user and/or other users, that indicates 7:00 is a popular dinner time. It is noted that if the original email 475C included a specified time (e.g., "Spike and I are going to dinner tomorrow night at 7:30. Want to join us?"), that the invite may be for that specified time. The reply content engine 128 of FIG. 1 may also utilize the output of the machine learning system 135, and the schedule data of the user, to determine one or more free times of the user for inclusion as options in the availability poll represented by graphical user interface element 485C.

Figure 5:
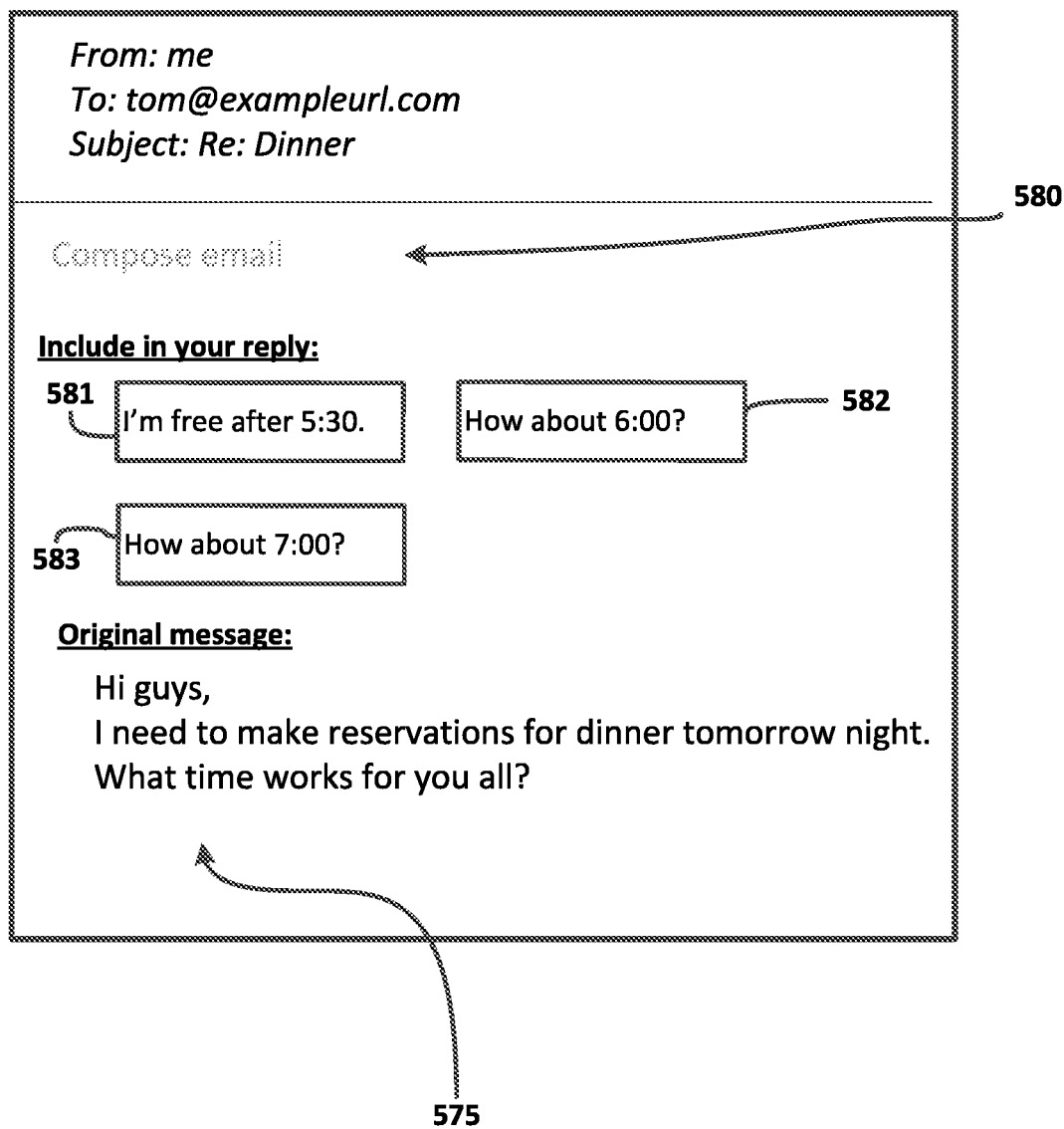
FIG. 5 illustrates another example graphical user interface for providing reply content for inclusion in a reply to an electronic communication.

FIG. 5 illustrates another example graphical user interface for providing reply content for inclusion in a reply to an electronic communication. The graphical user interface of FIG. 5 may be presented at client device 106 based on reply content that is determined and provided by reply content system 120. In FIG. 5, a user has provided user interface input (e.g., selecting a "reply" graphical user interface element) to initiate a reply to an original email and is presented with a reply section 580 that includes phantom text "Compose email" indicating to the user that the user can compose a reply in the reply section 580. The original email 575 to which the reply is responsive is also illustrated in FIG. 5 for reference of the user in generating the reply. The reply content options represented by graphical user interface elements 581, 582, and 583 are presented for inclusion in a reply to the email and, when selected via user interface input, are included in the reply.

In FIG. 5, the reply content options represented by graphical user interface elements 581, 582, and 583 are determined based on the original email 575 and based on schedule data of the user. In the example of FIG. 5, the schedule data of the user indicates the user is available after 5:30 "tomorrow night". Based on the schedule data and the original email 575, the "reply with time suggestion" graphical user interface elements 581, 582, and 583 may be determined as appropriate for providing to the user.

As one example, one or more message features of the original email 575 may be provided as input to the trained machine learning system 135 of FIG. 1 and the trained machine learning system 135 may provide, as output, an indication that a "reply with time suggestion", "tentative reply with time suggestion", and "declining reply" are appropriate responses based on the message features. The reply content engine 128 of FIG. 1 may utilize that output, and the schedule data of the user, to determine that "replies with time suggestions" are appropriate. The particular replies represented by graphical user interface elements 581, 582, and 583 may be determined by the reply content engine 128 based on available times indicated by the schedule data of the user and optionally other users (when access is available), and optionally based on history data, for the user and/or other users, that indicates the suggested times are popular dinner times.

As another example, one or more message features of the original email 575 and an "available" feature of the schedule data of the user may be provided as input to the trained machine learning system 135 of FIG. 1 and the trained machine learning system 135 may provide, as output, all or portions of the particular n-grams represented by the graphical user interface elements 581, 582, and 583. For example, the trained machine learning system 135 may provide, as output, "I'm free after [end time of last event]", "How about [available time]?". The reply content engine 128 of FIG. 1 may utilize that output to generate the graphical user interface elements 581, 582, and 583.

Figure 6:
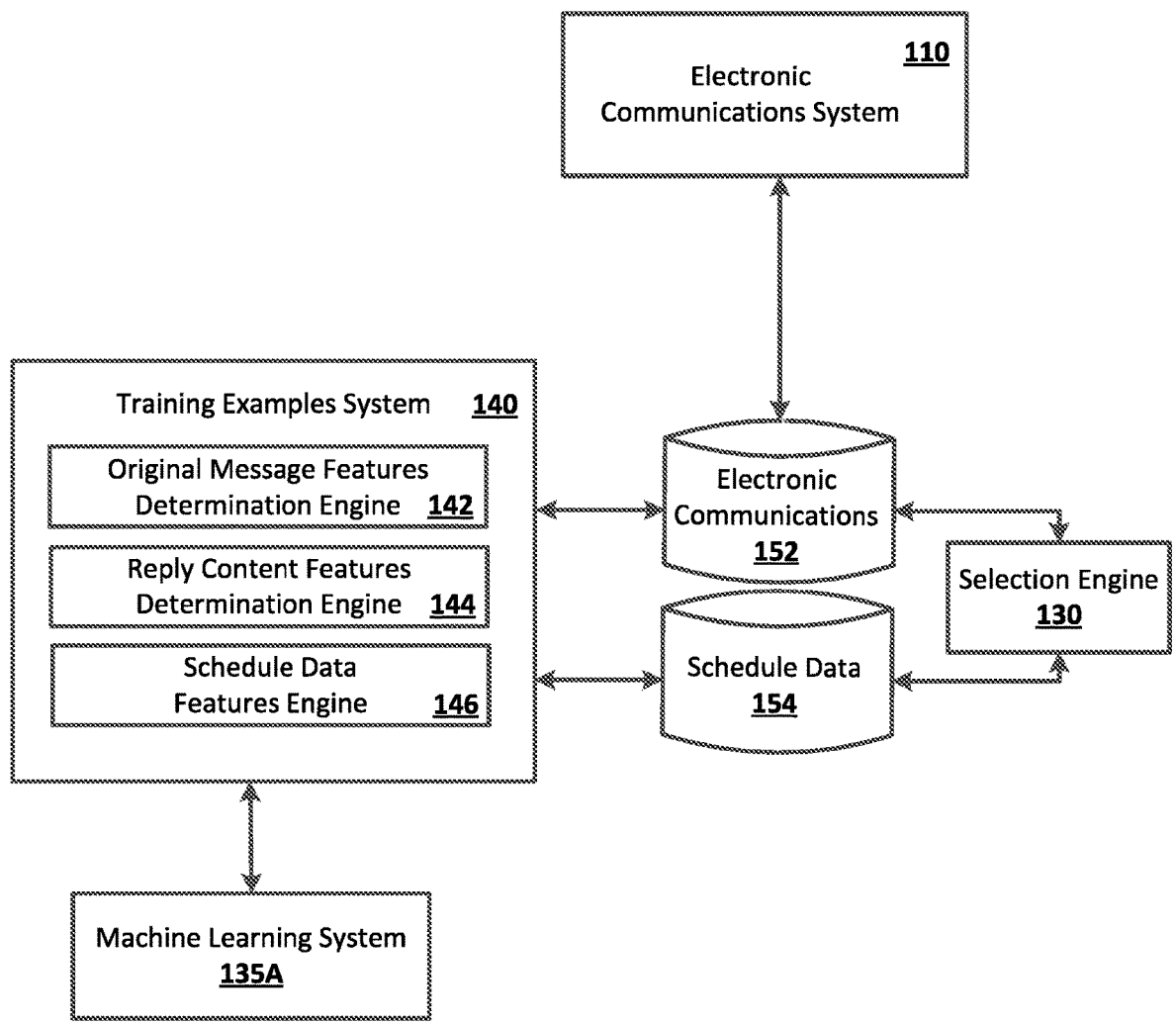
FIG. 6 illustrates an example environment in which electronic communications may be analyzed to generate training examples for training a machine learning system to generate output of one or more reply content features based on input of one or more message features and one or more schedule data features, and in which the machine learning system may be trained based on the training examples.
Figure 7:
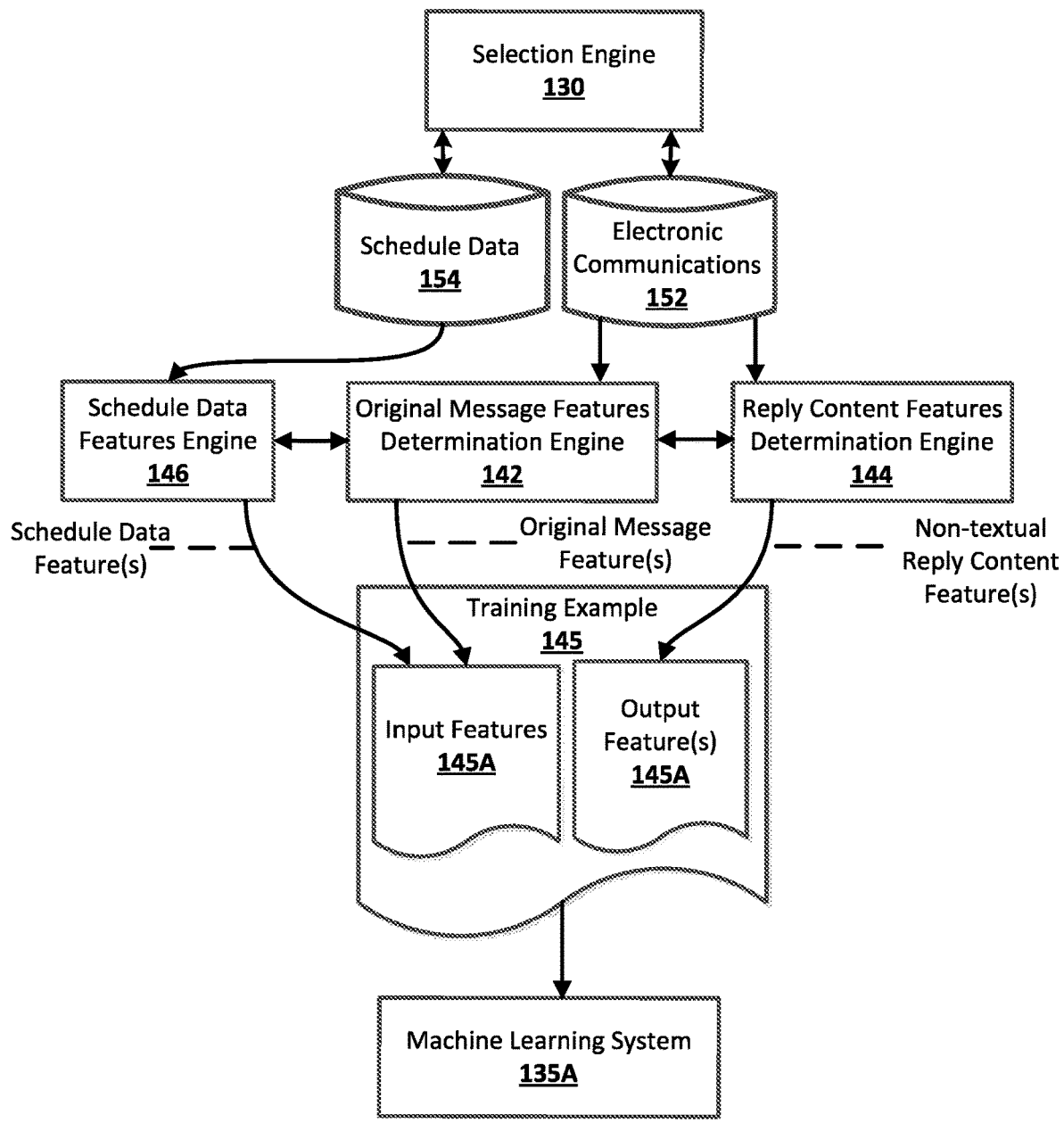
FIG. 7 illustrates an example of how training examples may be generated based on electronic communications and used to train a machine learning system to generate output of one or more reply content features based on input of one or more message features and one or more schedule data features.
Figure 8:
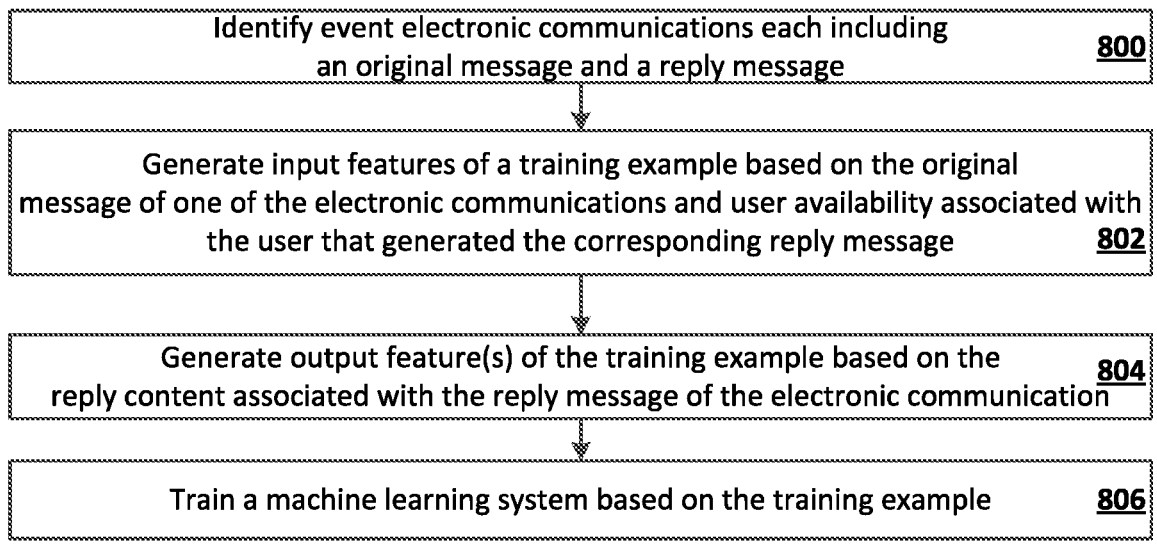
FIG. 8 is a flow chart illustrating an example method of generating training examples and using the training examples to train a machine learning system to generate output of one or more reply content features based on input of one or more message features and one or more schedule data features.

Turning now to FIGS. 6-8, additional description is provided of training the at least one trained machine learning system 135 of FIGS. 1 and 2 that may be utilized, for example, in various apparatus and methods described with respect to FIGS. 1-5.

FIG. 6 illustrates an example environment in which electronic communications may be analyzed to generate training examples for training a machine learning system to generate output of one or more reply content features based on input of one or more message features and one or more schedule data features, and in which the machine learning system may be trained based on the training examples.

The example environment of FIG. 6 includes the electronic communications system 110, the electronic communications database 152, and the schedule data 154 of one or more users of FIG. 1. The example environment of FIG. 6 also includes a machine learning system 135A that represents the at least one trained machine learning system 135 of FIG. 1 in its untrained state. The example environment of FIG. 6 also includes a selection engine 130 and a training examples system 140.

Selection engine 130, training examples system 140, and machine learning system 135A may each be implemented in one or more computing devices that communicate, for example, through a network. Selection engine 130, training examples system 140, and machine learning system 135A are example systems in which the systems, components, and techniques described herein may be implemented and/or with which systems, components, and techniques described herein may interface. Selection engine 130, training examples system 140, and machine learning system 135A each include one or more memories for storage of data and software applications, one or more processors for accessing data and executing applications, and other components that facilitate communication over a network. In some implementations, selection engine 130 and training examples system 140 may include one or more components of the example computing device of FIG. 9. The operations performed by selection engine 130, training examples system 140, and/or machine learning system 135A may be distributed across multiple computing devices. In some implementations, one or more aspects of selection engine 130, training examples system 140, and/or machine learning system 135A may be combined in a single computing device.

Generally, in some implementations training examples system 140 utilizes, without direct human access, past electronic communications of electronic communications database 152, and optionally associated schedule data 154, to generate training examples for training the machine learning system 135A. The training examples may be generated to train the machine learning system 135A to learn relationships between (1) one or more message features of "original" messages, optionally in combination with features related to schedule data of recipients of those original messages; and (2) one or more features related to reply content in "replies" to those original messages by the recipients.

For example, in some implementations the machine learning system 135A may be trained to determine relationships between message features of original messages in combination with features of schedule data of recipients and a likelihood that replies to electronic communications having those message features by recipients having schedule data with those features include an invite, an availability poll, and/or a link to an invite and/or availability poll. Also, for example, in some other implementations, the machine learning system 135A may be trained to determine relationships between message features of original messages in combination with features of schedule data of recipients and one or more n-grams and/or categories of n-grams included in replies to electronic communications having those message features by recipients having schedule data with those features.

In some implementations, the selection engine 130 may select, based on one or more criteria, communications that are utilized by the training example system 140 to generate training examples for training the machine learning system 135A. For example, the selection engine 130 may flag or otherwise annotate certain communications of the electronic communications database 152 as those that are appropriate for utilization by the training example system 140. In some implementations, the selection engine 130 may select the electronic communications that are utilized based on those electronic communications including an "original" message and a "reply" message that is responsive to the original message. As described herein, an electronic communication that includes an original message and a reply message may be a single document and/or multiple documents that are mapped to one another.

In some implementations, the selection engine 130 may select the electronic communications that are utilized for training examples for training of the machine learning system 135A based on those electronic communications including a reply with certain reply content, such as an invite, an availability poll, a link to an invite and/or availability poll, one or more n-grams, etc. In some implementations, the selection engine 130 may select the electronic communications that are utilized based on those electronic communications including a "reply" message that is by a recipient for which schedule data is available (e.g., available via schedule data 154).

In some implementations, the selection engine 130 may select the electronic communications that are utilized based on those electronic communications being event communications. For example, the selection engine 130 and/or other engine may determine an electronic communications is an event communication based on it including an "original" message that includes n-grams that reference a person, a place, a date, and/or a time. In some of those implementations, the selection engine 130 may include, or be in communication with, a classifier and/or other machine learning system that determines, based on features of an electronic communication, a likelihood that electronic communication pertains to an event—and may determine those electronic communications whose likelihood satisfies a threshold are event electronic communications.

In some implementations, the selection engine 130 may employ one or more techniques to reduce the occurrence of certain types of communications that are utilized in generating training examples. For example, where the database 152 includes emails, the selection engine 130 may employ techniques to filter out emails that are likely from businesses. For instance, emails from certain e-mail addresses, emails from email addresses with certain domain names, emails from email addresses with certain prefixes, emails with certain n-grams in a subject line, etc. may be filtered out. Also, for instance, emails that conform to certain business templates may be filtered out. Also, for instance, emails that are likely spam may be filtered out. In some implementations, the selection engine 130 selects electronic communications based on other attribute(s) associated with the communications and/or the sender(s) and/or recipient(s) of the communications. For example, if it is desirable to determine relationships for a particular geographic region and/or domain, communications associated with that geographic region and/or domain may be selected.

In various implementations, training examples system 140 includes an original message features determination engine 142, a reply content features determination engine 144, and a schedule data features engine 146. In some implementations, all or aspects of engines 142, 144, and/or 146 may be omitted, combined, and/or implemented in a component that is separate from training examples system 140. For example, in some implementations schedule data features engine 146 may be omitted and training examples generated to train a machine learning system to receive, as input, one or more message features (and not any schedule data) and provide, as output, one or more features of reply content.

Generally, the original message features determination engine 142, the reply content features determination engine 144, and optionally the schedule data features engine 146 work in concert and determine a plurality of training examples, each based on a corresponding one of a plurality of electronic communications having an original message and a reply message. For a given electronic communication having an original message and a reply message, the original message features determination engine 142 determines a vector of original message features based on the original message of the given electronic communication, and the reply content features determination engine 144 determines a vector of one or more features of reply content based on the reply message of the given electronic communication.

The vector of original message features and the vector of one or more features of reply content that are included in the training examples will be dependent on the desired input parameters and desired output parameter(s) of the implementation of the machine learning system 135A. For example, assume the machine learning system 135A is being trained to provide, as output, a likelihood that a reply to an electronic communication will include an invite and/or a link to an invite. In such a situation the reply content features determination engine 144 may generate training examples that each include a vector of one or more reply content features that is a single feature that is either "true" (includes an invite and/or a link to an invite) or "false" (does not include an invite and/or a link to an invite).

As another example, assume the machine learning system 135A is being trained to provide, as output: a corresponding likelihood, for each of one or more categories of n-grams (e.g., semantic categories), that a reply message of an electronic communication will include that category. For instance: 1) a likelihood that a reply to an electronic communication includes a "confirmatory reply"; 2) a likelihood that a reply to an electronic communication includes a "declining reply"; 3) a likelihood that a reply to an electronic communication includes a "confirmatory reply with a time suggestion"; 4) a likelihood that a reply to an electronic communication includes a "declining reply with an indication of a conflicting event"; etc. In such a situation the reply content features determination engine 144 may generate training examples that each include a vector of a plurality of reply content features that are each either "true" (includes an n-gram of that category) or "false" (does not include an n-gram of that category).

In some implementations, the reply content features determination engine 144 may determine one or more semantic categories of reply messages based on grouping electronic communications into a plurality of clusters based on similarity of reply messages of those electronic communications, and determining the semantic categories based on the clusters. In some of those implementations, the reply content features determination engine 144 groups the electronic communications into a plurality of clusters based on similarities between the text of the reply messages of the electronic communications of the corpus, such as semantic, syntactic, and/or textual similarities. Generally, the reply messages of electronic communications that are grouped in a given cluster will be more similar to one another (based on the similarities utilized in the grouping) than to the reply messages grouped in other clusters. Each of the determined clusters may to a different semantic category of content of the reply message. In some implementations, the reply content features determination engine 144 may utilize one or more clustering algorithms in grouping electronic communications into a plurality of clusters based on similarity measures between the reply messages. For example, in some implementations x-means clustering may be utilized, with the distance between reply messages being based on the similarity measures between the original messages. Generally, x-means clustering is an unsupervised method of finding the ideal k to use for k-means clustering. Generally, k-means clustering aims to partition observations into a plurality of groups, with each observation being included in a group with which it is most related. Additional and/or alternative clustering techniques may optionally be used.

Various original message features may be determined by the original message features determination engine 142 such as syntactic, semantic, n-gram, and/or metadata based features. For example, one or more original message features may indicate whether a particular n-gram is present in one or more locations of an original message, or whether any n-gram of a particular category of n-grams is present in one or more locations of an original message. A category of n-grams may be, for example, a group of n-grams that have similar semantic meaning. As another example, an original message feature may indicate a quantity of recipients of the original email, such as "one", "two to five", or "five or more." As yet another example, an original message feature may indicate a semantic feature of one or more portions of an original message, such as a semantic feature of a subject of the original message, all or portions of the body of the original message, etc.

As described herein, in some implementations original message features of training examples may be paired with one or more features based on schedule data of a user that generated the reply message for which the corresponding reply content features are determined by reply content features determination engine 144. For example, for a given electronic communication, the original message features engine 142 may determine one or more message features based on the original message of the electronic communication, the reply content features determination engine 144 may determine one or more reply content features based on the reply message of the electronic communication, and the schedule data features engine 146 may determine one or more schedule data features based on schedule data 154 of the user that generated the reply message of the electronic communication, where that schedule data is related to an event of the original message. For example, the schedule data features engine 146 may determine the schedule data features based on the availability of the user that generated the reply to attend the event of the original message, where that availability indicates the availability at the time the reply message was authored (e.g., based on schedule data entries of the user that do not themselves reference the event of the original message). The message features and the schedule data features may be utilized as input features of a training example and the reply content features may be utilized as the output features of the training example.

Various schedule data features may be determined by the schedule data features engine 146. For example, the schedule data features may indicate whether the user is "available", "unavailable", or "potentially unavailable" for an event of an original message. Also, for example, the schedule data features may indicate a property of a schedule data entry that conflicts with, or potentially conflicts with, an event of an original message. The property may be, for example, a title of the schedule data entry, a duration of the schedule data entry, a category of the schedule data entry, etc. In some implementations, the schedule data features engine 146 may determine the availability of a user for an event of an original message and/or other schedule data features by searching schedule data 154 of the user based on a temporal indication (i.e., indicating a date and/or time) associated with the event of the original message. For example, the user availability may be determined based on whether the user schedule data indicates the user had an already scheduled event during or near the date and/or time associated with the event.

The training examples generated by the training examples system 140 for the machine learning system 135A are provided to the machine learning system 135A to train the machine learning system 135A. During training, the machine learning system 135A iteratively learns a hierarchy of feature representations based on the training examples generated by the training examples system 140.

Turning now to FIG. 7, an example is provided of how training examples may be generated based on electronic communications and used to train a machine learning system to generate output of one or more reply content features based on input of one or more message features and one or more schedule data features. The selection engine 130 may select, based on one or more criteria, communications from electronic communications database 152 that are to be utilized to generate training examples for training the machine learning system 135A. For example, the selection engine 130 may select the electronic communications based on: those electronic communications including an "original" message and a "reply" message that is responsive to the original message; those electronic communications including a "reply" message that is by a recipient for which schedule data is available (e.g., available via schedule data 154); and/or those electronic communications likely pertaining to an event.

For a given electronic communication of the electronic communications, the original message features determination engine 142 determines a vector of original message features based on the original message of the given electronic communication and includes the original message features as input features 145A of a corresponding training example 145.

The reply content features determination engine 144 determines a vector of one or more reply content features based on the reply message of the given electronic communication and includes the reply content features as output features 145B of the corresponding training example 145.

The schedule data features engine 146 determines a vector of one or more schedule data features based on schedule data 154 of the user that generated the reply message and that is temporally related to an event of the original message. The schedule data features engine 146 includes the schedule data feature(s) as additional input features of the input features 145A of the training example 145

The training example 145 is utilized to train the machine learning system 135A. Although only a single training example 145 is illustrated in FIG. 7, it is understood that the engines 142, 144, and 146 will generate a plurality of training examples (each being based on a corresponding electronic communication) and the plurality of training examples utilized to train the machine learning system 135A.

As one specific implementation of FIG. 7, the training example 145 and all additional training examples may each have an output parameter indicative of which of a plurality of semantic categories of n-grams is included in a reply message of a corresponding electronic communication and one or more input parameters based on the original message of the corresponding electronic communication and based on the schedule data of the user that generated the reply message of the corresponding electronic communication. For instance, the reply content features determination engine 144 may generate, based on a reply message that includes "I can make it. How about 7:30?", reply content features for an output of a first training example that includes an indication of a semantic category of "confirmatory reply, with time suggestion". The original message features determination engine 142 may generate, based on a corresponding original message, original message features as input of the first training example. The original message features may include, for example, one or more syntactic, semantic, and/or n-gram based features of the original message. The schedule data features engine 146 may generate, as further input of the first training example, an "available" availability of the user based on schedule data of the user that generated the reply message.

Also, for instance, the reply content features determination engine 144 may generate, based on a reply message that includes "Sorry, can't make it", reply content features for an output of a second training example that includes an indication of a semantic category of "declining reply". The original message features determination engine 142 may generate, based on a corresponding original message, original message features as input of the first training example. The schedule data features engine 146 may generate, as further input of the first training example, an "unavailable" availability of the user based on schedule data of the user that generated the reply message.

Additional training examples may be similarly generated, including additional examples each having output features based on other semantic categories of n-grams. The machine learning system may be trained based on the training examples. The trained machine learning system may receive, as input, one or more features of an original message and schedule data of a user that pertains to an event of the original message and provide, as output, one or more semantic categories of n-grams and optionally associated likelihoods to be included in a reply to the original message.

FIG. 8 is a flow chart illustrating an example method of generating training examples and using the training examples to train a machine learning system to generate output of one or more reply content features based on input of one or more message features and one or more schedule data features. For convenience, the operations of the flow chart are described with reference to a system that performs the operations. This system may include various components of various computer systems. For instance, some operations may be performed by one or more components of the training example system 140 and/or the machine learning system 135A of FIG. 6. Moreover, while operations of the method of FIG. 8 are shown in a particular order, this is not meant to be limiting. One or more operations may be reordered, omitted or added.

At block 800, the system identifies event electronic communications that each includes an original message and a reply message.

At block 802, the system generates input features of a training example based on the original message of one of the electronic communications and user availability associated with the user that generated the corresponding reply message.

At block 804, the system generates output feature(s) of the training example based on reply content associated with the reply message of the electronic communication. For example, in one implementation the output feature(s) may be either "true" or "false" and will be true if the reply message includes an invite and/or link to an invite, and false otherwise. Also, for example, in another implementation the output feature(s) may be include multiple features that are each either "true" or "false", and that are each indicative of whether the reply message includes a particular sematic and/or other category of n-gram. For instance, a first feature may indicate "confirmatory replies", a second feature may indicate "declining replies", etc.

At block 806, the system trains a machine learning system based on the training example.

Although the method of FIG. 8 is described with respect to a single training example, it is understood that one or more of the steps (e.g., blocks 802, 804, and 806) may be performed iteratively to determine multiple training examples and train the machine learning system based on the multiple training examples.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 9:
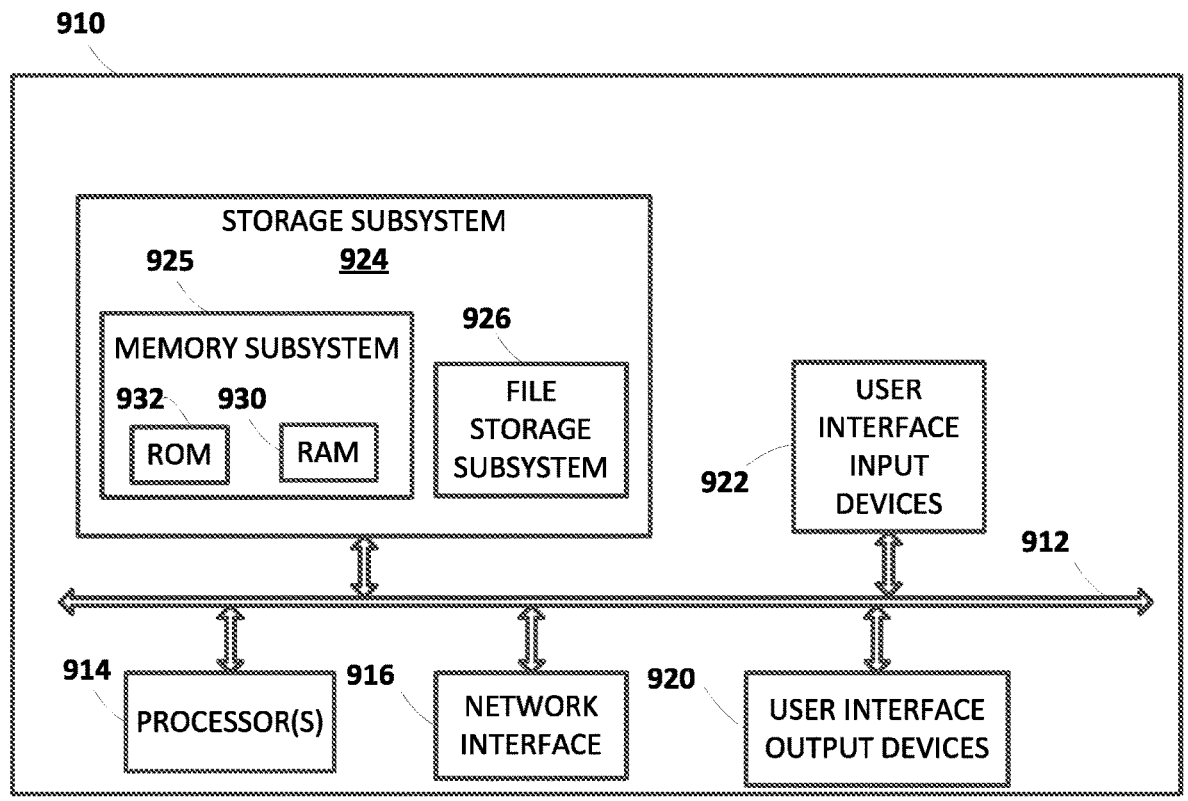
FIG. 9 illustrates an example architecture of a computing device.

FIG. 9 is a block diagram of an example computing device 910. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods of FIG. 3 and/or FIG. 8.

These software modules are generally executed by processor 917 alone or in combination with other processors. Memory 925 used in the storage subsystem can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 927, or in other machines accessible by the processor(s) 917.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving an electronic communication sent to a user, wherein the electronic communication references an event, but is not a structured invitation for the event;
   determining availability of the user, to whom the electronic communication is sent, for the event referenced in the electronic communication;
   determining one or more message features of the electronic communication, the message features comprising a first message feature based on an n-gram in a body of the electronic communication;
   generating reply content and additional reply content based on the availability of the user to whom the electronic communication is sent and based on the one or more message features of the electronic communication;
   when the electronic communication is being viewed by the user and before the user has provided any user interface input indicating a desire to reply to the electronic communication:
      providing, via a graphical user interface, a graphical indication of the reply content,
      providing, via the graphical user interface and with the graphical indication of the reply content, an additional graphical indication of the additional reply content;
      receiving, via the graphical user interface, a selection of the graphical indication via a user interface input device; and
      in response to receiving the selection, automatically incorporating the reply content in a reply electronic communication that is a reply, by the user to whom the electronic communication is sent, to the electronic communication;
   wherein selection of the additional graphical indication via the user interface input device, in lieu of selection of the graphical indication, causes the additional reply content to be incorporated in the reply electronic communication.

2. The method of claim 1, further comprising:
   ranking the reply content and the additional reply content relative to one another; and determining, based on the ranking, a prominence for providing the graphical indication of the reply content and the additional graphical indication of the additional reply content;
   wherein providing the graphical indication and the additional graphical indication comprises providing the graphical indication and the additional graphical indication based on the determined prominence.

3. The method of claim 1, further comprising:
   providing, with the graphical indication of the reply content, a further graphical indication that the reply content is based on the availability of the user.

4. The method of claim 1, wherein generating the reply content comprises generating a reply n-gram;

wherein providing the graphical indication of the reply content comprises providing the reply n-gram; and wherein automatically incorporating the reply content in the reply electronic communication comprises automatically incorporating the reply n-gram in the reply electronic communication.

5. The method of claim 1, wherein generating the reply content comprises: providing the message features and the availability of the user as input to a trained machine learning system;

receiving at least one reply content feature as output from the trained machine learning system; and generating the reply content based on the at least one reply content feature received as output from the trained machine learning system.

6. The method of claim 5, wherein the first message feature is an embedding generated based on the n-gram and based on one or more additional n-grams in the body of the electronic communication.

7. The method of claim 6, further comprising: labeling each of a plurality of n-grams of the electronic communication with at least one corresponding grammatical annotation;

wherein determining the first message feature comprises selecting the n-gram for us in determining the first message feature based on the corresponding grammatical annotation of the n-gram, and determining the first message feature based on the n-gram.

8. The method of claim 1, wherein determining the availability of the user for the event comprises determining the availability of the user based on schedule data of the user.

9. The method of claim 8, wherein determining the availability of the user based on the schedule data of the user comprises searching the schedule data of the user based on a temporal indication that is included in the electronic communication and that is associated with the event.

10. The method of claim 9, further comprising:

determining the temporal indication associated with the event of the electronic communication based on one or more temporal n-grams of the electronic communication.

11. The method of claim 9, wherein the reply content is a calendar invite or an availability poll.

12. A method implemented by one or more processors, the method comprising:

receiving an electronic communication sent to a user, wherein the electronic communication references an event, but is not a structured invitation for the event;

determining availability of the user, to whom the electronic communication is sent, for the event referenced in the electronic communication;

determining one or more message features of the electronic communication, the message features comprising a first message feature based on an n-gram in a body of the electronic communication;

providing the message features and the availability of the user as input to a trained machine learning system;

determining, based on output from the trained machine learning system, a likelihood that a reply to the electronic communication will include an invite and/or a poll; and when the likelihood satisfies a threshold, when the electronic communication is being viewed by the user, and before the user has provided any user interface input indicating a desire to reply to the electronic communication:

providing, via a graphical user interface, an invite graphical indication of the invite and/or a poll graphical indication of the poll, receiving, via the graphical user interface, a selection of one of the invite graphical indication or the poll graphical indication; and in response to receiving the selection, automatically including corresponding one of the invite or the poll in a reply electronic communication that is a reply, by the user to whom the electronic communication is sent, to the electronic communication.

13. The method of claim 12, wherein the first message feature is an embedding generated based on the n-gram and based on one or more additional n-grams in the body of the electronic communication.

14. The method of claim 12, wherein determining the availability of the user for the event comprises determining the availability of the user based on schedule data of the user.

15. The method of claim 14, wherein determining the availability of the user based on the schedule data of the user comprises searching the schedule data of the user based on a temporal indication that is included in the electronic communication and that is associated with the event.

16. A system, comprising:

an electronic communication stored in one or more non-transitory computer readable media, wherein the electronic communication is sent to a user and references an event, but is not a structured invitation for the event;

at least one processor;

memory coupled to the processor, wherein the memory stores instructions to be executed by the processor to perform steps comprising:

determining availability of the user, to whom the electronic communication is sent, for the event referenced in the electronic communication;

determining one or more message features of the electronic communication, the message features comprising a first message feature based on an n-gram in a body of the electronic communication;

generating reply content and additional reply content based on the availability of the user to whom the electronic communication is sent and based on the one or more message features of the electronic communication;

when the electronic communication is being viewed by the user and before the user has provided any user interface input indicating a desire to reply to the electronic communication:

providing, via a graphical user interface, a graphical indication of the reply content, providing, via the graphical user interface and with the graphical indication of the reply content, an additional graphical indication of the additional reply content;

receiving, via the graphical user interface, a selection of the graphical indication via a user interface input device; and in response to receiving the selection, automatically incorporating the reply content in a reply electronic communication that is a reply, by the user to whom the electronic communication is sent, to the electronic communication;

wherein selection of the additional graphical indication via the user interface input device, in lieu of selection of the graphical indication, causes the additional reply content to be incorporated in the reply electronic communication.

\* \* \* \* \*